(12) United States Patent  (10) Patent No.: US 7,409,380 B1
Mazzagatti et al.  (45) Date of Patent: Aug. 5, 2008

(54) FACILITATED REUSE OF K LOCATIONS IN A KNOWLEDGE STORE

(75) Inventors: Jane Campbell Mazzagatti, Blue Bell, PA (US); Jane Van Keuren Claar, Bethlehem, PA (US); Timothy William Collins, Lansdowne, PA (US); Steven L. Rajcan, Glenmoore, PA (US)

(73) Assignee: Unisys Corporation, Blue Bell, PA (US)

( * ) Notice: Subject to any disclaimer, the term of this patent is extended or adjusted under 35 U.S.C. 154(b) by 404 days.

(21) Appl. No.: 11/100,830

(22) Filed: Apr. 7, 2005

(51) Int. Cl.
G06F 17/30 (2006.01)
G06F 15/16 (2006.01)
(52) U.S. Cl. .......................... 707/1; 707/100
(58) Field of Classification Search ................ 707/1, 707/100
See application file for complete search history.

(56) References Cited

U.S. PATENT DOCUMENTS

| | | |
|---|---|---|
| 4,286,330 A | 8/1981 | Isaacson |
| 5,245,337 A | 9/1993 | Bugajski |
| 5,293,164 A | 3/1994 | Bugajski |
| 5,592,667 A | 1/1997 | Bugajski |
| 5,630,125 A | 5/1997 | Zellweger |
| 5,634,133 A | 5/1997 | Kelley |
| 5,829,004 A | 10/1998 | Au |
| 5,894,311 A | 4/1999 | Jackson |
| 5,918,229 A | 6/1999 | Davis et al. |
| 5,930,805 A | 7/1999 | Marquis |

(Continued)

FOREIGN PATENT DOCUMENTS

| EP | 0 079 465 | 1/1985 |
|---|---|---|
| WO | WO 95/17783 | 6/1995 |
| WO | WO 99/34307 | 7/1999 |
| WO | WO 01/46834 | 6/2001 |

OTHER PUBLICATIONS

Won Kim & Myung Kim, "Performance and Scaleability in Knowledge Engineering: Issues and Solutions", Journal of Object-Oriented Programming, vol. 12, No. 7, pp. 39-43, Nov./Dec. 1999.

(Continued)

*Primary Examiner*—Tony Mahmoudi
(74) *Attorney, Agent, or Firm*—Richard J. Gregson; Robert P. Marley; Susan Murphy

(57) ABSTRACT

In learning for an interlocking trees datastore or KStore, the process is made more efficient by noting the (n-level) address within the KStore during the learning of each particle. In a pre-particle stream of data, which may be organized within or before the Learn Engine prior to this, "Marks" and "References" are inserted. Each Mark identifies where any number of References may start the learning process, enabling the avoidance of re-learning redundant data. Thus, in a field record data set, the redundant data fields (or even partial fields) can be skipped over and only the new data learned. The Marks and References are removed before processing into a particle stream. When particles are learned the K Engine returns the n-level address or pointer(s) which the Learn Engine uses to associate with the relevant Reference(s). The system can be implemented in hardware if desired to speed processing. No limit to the distribution or numbers of KStores, Learn Engines being used or K Engines being used is indicated.

23 Claims, 13 Drawing Sheets

U.S. PATENT DOCUMENTS

| | | | |
|---|---|---|---|
| 5,963,965 | A | 10/1999 | Vogel |
| 5,966,709 | A | 10/1999 | Zhang et al. |
| 5,970,490 | A * | 10/1999 | Morgenstern ................ 707/10 |
| 5,978,794 | A | 11/1999 | Agrawal et al. |
| 5,983,232 | A | 11/1999 | Zhang |
| 6,018,734 | A | 1/2000 | Zhang |
| 6,029,170 | A | 2/2000 | Garger |
| 6,031,993 | A | 2/2000 | Andrews et al. |
| 6,102,958 | A | 8/2000 | Meystel |
| 6,115,715 | A | 9/2000 | Traversat et al. |
| 6,138,115 | A | 10/2000 | Agrawal et al. |
| 6,138,117 | A | 10/2000 | Bayardo |
| 6,144,962 | A | 11/2000 | Weinberg et al. |
| 6,160,549 | A | 12/2000 | Touma et al. |
| 6,233,575 | B1 | 5/2001 | Agrawal et al. |
| 6,275,817 | B1 | 8/2001 | Reed et al. |
| 6,278,987 | B1 | 8/2001 | Reed et al. |
| 6,286,002 | B1 | 9/2001 | Axaopoulos et al. |
| 6,341,281 | B1 | 1/2002 | MacNicol et al. |
| 6,356,902 | B1 | 3/2002 | Tan et al. |
| 6,360,224 | B1 | 3/2002 | Chickering |
| 6,373,484 | B1 | 4/2002 | Orell et al. |
| 6,381,600 | B1 | 4/2002 | Lau |
| 6,389,406 | B1 | 5/2002 | Reed et al. |
| 6,394,263 | B1 | 5/2002 | McCrory |
| 6,453,314 | B1 | 9/2002 | Chan et al. |
| 6,470,277 | B1 | 10/2002 | Chin et al. |
| 6,470,344 | B1 | 10/2002 | Kothuri et al. |
| 6,473,757 | B1 | 10/2002 | Garofalakis et al. |
| 6,477,683 | B1 | 11/2002 | Killian et al. |
| 6,499,026 | B1 | 12/2002 | Rivette et al. |
| 6,505,184 | B1 | 1/2003 | Reed et al. |
| 6,505,205 | B1 | 1/2003 | Kothuri et al. |
| 6,581,063 | B1 | 6/2003 | Kirkman |
| 6,591,272 | B1 | 7/2003 | Williams |
| 6,604,114 | B1 | 8/2003 | Toong et al. |
| 6,615,202 | B1 | 9/2003 | Ding et al. |
| 6,624,762 | B1 | 9/2003 | End, III |
| 6,635,089 | B1 | 10/2003 | Burkett et al. |
| 6,662,185 | B1 | 12/2003 | Stark et al. |
| 6,681,225 | B1 | 1/2004 | Uceda-Sosa et al. |
| 6,684,207 | B1 | 1/2004 | Greenfield et al. |
| 6,691,109 | B2 | 2/2004 | Bjornson et al. |
| 6,704,729 | B1 | 3/2004 | Klein et al. |
| 6,711,585 | B1 | 3/2004 | Copperman et al. |
| 6,745,194 | B2 | 6/2004 | Burrows |
| 6,748,378 | B1 | 6/2004 | Lavender et al. |
| 6,751,622 | B1 | 6/2004 | Puri et al. |
| 6,760,720 | B1 | 7/2004 | De Bellis |
| 6,768,995 | B2 | 7/2004 | Their et al. |
| 6,769,124 | B1 | 7/2004 | Schoening et al. |
| 6,799,184 | B2 | 9/2004 | Bhatt et al. |
| 6,804,688 | B2 | 10/2004 | Kobayashi et al. |
| 6,807,541 | B2 | 10/2004 | Bender et al. |
| 6,816,856 | B2 | 11/2004 | Baskins et al. |
| 6,826,556 | B1 | 11/2004 | Miller et al. |
| 6,831,668 | B2 | 12/2004 | Cras et al. |
| 6,868,414 | B2 | 3/2005 | Khanna et al. |
| 6,900,807 | B1 | 5/2005 | Liongosari et al. |
| 6,920,608 | B1 | 7/2005 | Davis |
| 6,931,401 | B2 | 8/2005 | Gibson et al. |
| 6,952,736 | B1 | 10/2005 | Westbrook |
| 6,965,892 | B1 | 11/2005 | Uceda-Sosa et al. |
| 7,027,052 | B1 | 4/2006 | Thorn et al. |
| 7,228,296 | B2 * | 6/2007 | Matsuda ........................ 707/2 |
| 2002/0124003 | A1 | 9/2002 | Rajasekaran et al. |
| 2002/0138353 | A1 | 9/2002 | Schreiber et al. |
| 2002/0143735 | A1 * | 10/2002 | Ayi et al. ....................... 707/1 |
| 2002/0143783 | A1 | 10/2002 | Bakalash et al. |
| 2002/0188613 | A1 | 12/2002 | Chakraborty et al. |
| 2002/0194173 | A1 | 12/2002 | Bjornson et al. |
| 2003/0009443 | A1 | 1/2003 | Yatviskly |
| 2003/0033279 | A1 | 2/2003 | Gibson et al. |
| 2003/0093424 | A1 | 5/2003 | Chun et al. |
| 2003/0115176 | A1 | 6/2003 | Bobroff et al. |
| 2003/0120651 | A1 | 6/2003 | Bernstein |
| 2003/0204513 | A1 | 10/2003 | Bumbulis |
| 2003/0204515 | A1 | 10/2003 | Shadmon et al. |
| 2003/0217335 | A1 | 11/2003 | Chung et al. |
| 2004/0107186 | A1 | 6/2004 | Najork et al. |
| 2004/0133590 | A1 | 7/2004 | Henderson et al. |
| 2004/0143571 | A1 | 7/2004 | Bjornson et al. |
| 2004/0169654 | A1 | 9/2004 | Walker et al. |
| 2004/0230560 | A1 | 11/2004 | Elza et al. |
| 2004/0249781 | A1 | 12/2004 | Anderson |
| 2005/0015383 | A1 | 1/2005 | Harjanto |
| 2005/0050054 | A1 | 3/2005 | Clark et al. |
| 2005/0060325 | A1 | 3/2005 | Bakalash et al. |
| 2005/0071370 | A1 | 3/2005 | Atschul et al. |
| 2005/0080800 | A1 | 4/2005 | Parupudi et al. |
| 2005/0097108 | A1 | 5/2005 | Wang et al. |
| 2005/0102294 | A1 | 5/2005 | Coldewey |
| 2005/0149503 | A1 | 7/2005 | Raghavachari |
| 2005/0171960 | A1 | 8/2005 | Lomet |
| 2005/0179684 | A1 | 8/2005 | Wallace |
| 2005/0198042 | A1 | 9/2005 | Russell et al. |
| 2005/0262108 | A1 | 11/2005 | Gupta |

OTHER PUBLICATIONS

Jeffrey O. Kephart & David M. Chess, "The Vision of Autonomic Computing", T.J. Watson Research Jan. 2003.

Linda Dailey Paulson, "Computer System, Heal Thyself", Aug. 2003.

Dave Gussow, "Headline: IBM-Enterprise Storage Server Shines at Colgate Palmolive", Jan. 6, 2003.

Caroline Humer, "IBM Creates Self-Healing Computer Unit", Jan. 8, 2003.

Burton F. W. et al: Multiple Generation Text Files Using Overlaping Tree Structures, Computer Journal, Oxford University Press, Surrey, GB. vol. 28, No. 4 Aug. 1985, pp. 414-416.

* cited by examiner

Original Sample Data Set – Sales Team Activities

Bill Tuesday 100 sold PA
Bill Tuesday 100 sold PA
Bill Tuesday 100 sold PA
Bill Tuesday 100 sold PA
Bill Tuesday 100 sold PA
Bill Monday 103 sold NJ
Bill Monday 100 trial PA
Bill Monday 100 trial PA
Bill Monday 100 trial PA
Tom Monday 100 sold PA
Tom Monday 100 sold PA
Tom Monday 103 trial NJ
Tom Monday 103 trial NJ
Tom Monday 103 trial NJ

Fig. 6

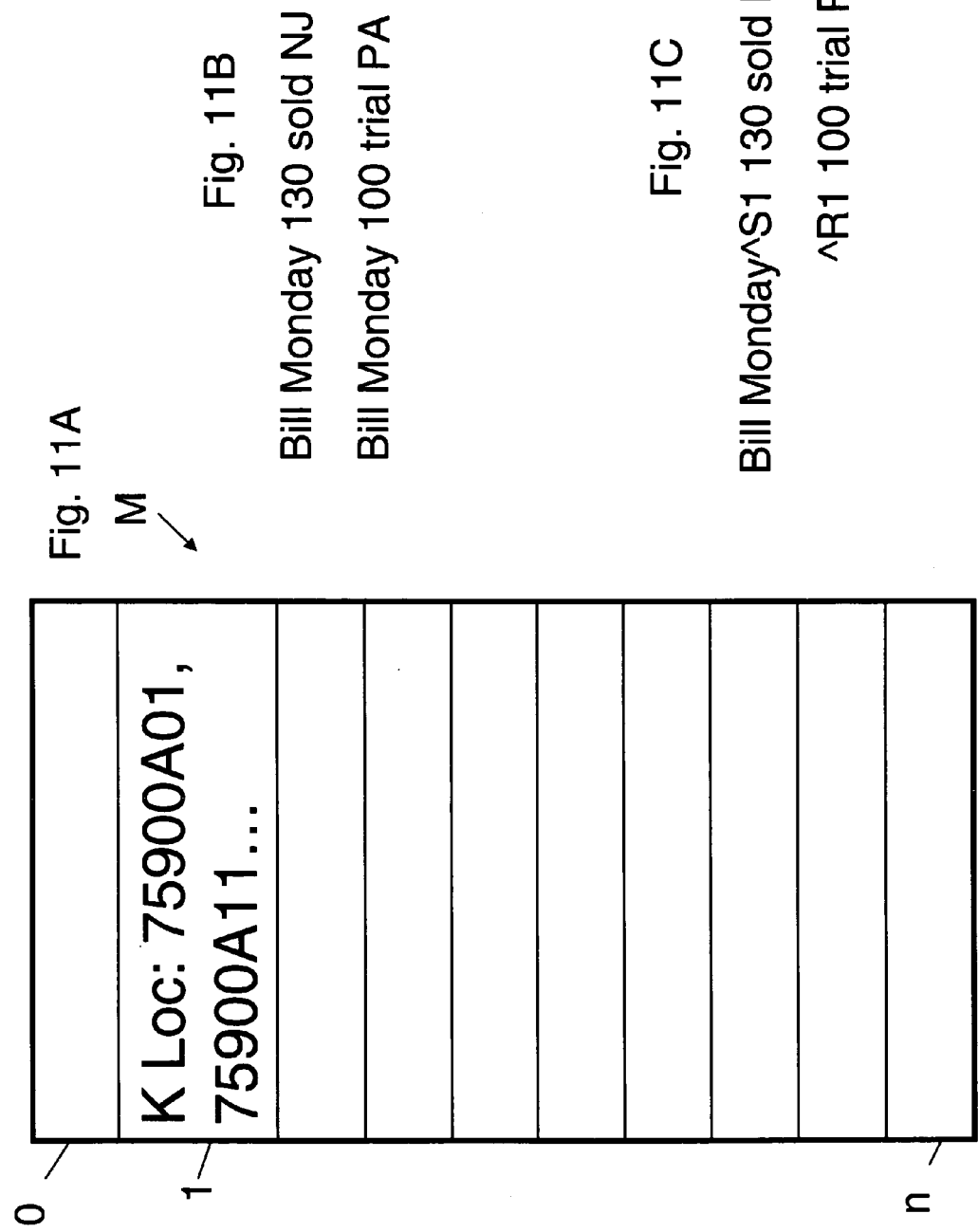

FACILITATED REUSE OF K LOCATIONS IN A KNOWLEDGE STORE

FIELD OF THE INVENTION

This invention relates to the field of manipulation of interlocking trees datastores, particularly to methods and systems for establishing and using pointers to avoid redundant efforts for event recording into interlocking trees datastores.

BACKGROUND OF THE INVENTION

We have developed a system and various methods for creating and using interlocking trees datastores and various features of said interlocking trees datastores. We refer to an instantiation of these interlocking trees datastores that we have developed as a "KStore" or just "K". In particular, these structures and methods have been described in copending patent applications U.S. Ser. Nos. 10/385,421, (now published as US 20040181547 A1) and 10/666,382, by inventor Mazzagatti. Additionally, we described a system in which such interlocking trees datastores could more effectively be used in U.S. Ser. No. 10/879,329. We hereby incorporate these referenced patent documents in their respective entireties into this patent by this reference. While the system and method we describe in this patent relate with particularity to the specific interlocking trees datastores which inventor Mazzagatti hereof described in the above-referenced patent (applications), it should be readily apparent that the system and methods described herein may also be applicable to similar structures.

While the interlocking trees datastores structure created by the system originally described in co-pending patent application U.S. Ser. No. 10/385,421, and the means for the Learn Engine taught in co-pending patent application U.S. Ser. No. 10/879,329 to accept multiple fields, (hereinafter also referred to as columns) of data within a single data record to create the interlocking trees datastore structure, provides many useful traits for understanding and using the inventions described, it has come to our attention that the system throughput during the learning processing can be greatly increased if there were some way to reduce processing of duplicate information. In doing so we could reduce the need to particlized as well as the amount of traversal of the KStore to record certain events.

The problem we noticed can be generally stated as relating to record sets with ordered field variables, where only a relatively small number of the field variables change from one record or sequence to the next record or sequence. (A "record" or other grouping of variables is generally referred to herein as a sequence. This could be a tune in a database of audio files, a cache line in a memory dump or any other "record"—like sequence. In a field record universe of, for example, sales data, the variables in a sales transaction would be such a record or sequence.) We felt we should look at these kinds of data streams and record sets to find solutions. A particular situation which has this problem is found where the data stream has tables within it, where each of the table entries will branch many times from one particular point within the record of the data stream. Another example would be where a single individual makes many purchases. The records of this individual's purchases would have a branch at each purchase, with perhaps a date, price and item number for each record, but an initial (or other) part of the record, with name address etc, would be identical. For these data streams and record sets it was apparent to us that the time to accomplish learning of an event particle sequence for field record data that we were experimenting with was much higher than it needed to be. It also seemed as if there should be a way to make it faster to learn in situations where much of the data from record to record was common and few variables changed. In the example, name, address, and other personal information would not change from one record to a next record, so we really only need to learn the new variable values from each record.

The potential to save and use K location pointers during KStore learning was mentioned in our co-pending application Ser. No. 10/879,329, but it was not used to do so. No specific mechanism was configured at that time. We describe an implementation to accomplish reuse of K location pointers in this patent.

SUMMARY OF THE INVENTION

We have determined that we can use specialized characters in an input data stream, inserting them and or processing them where appropriate, prior to processing by a K Engine. In a preferred embodiment we use a scratchpad memory of the Learn Engine, to facilitate this insertion and prior processing, but this could also be done using an application's memory area. By associating these insertion points with addresses in the KStore, we can go directly from specific pre-"particles" in the input data stream to locations within KStore that are implicated in recording such specific particles as events.

For this invention, a Learn Engine recognizes control characters in a sequence that are added to the input data stream. These control characters are designated to indicate that a particular K location should be assigned a reference or label that can be used to re-establish that K location as the current K location for the Learn Engine. In so doing, the Learn Engine can configure the next particle-message it sends to the K Engine with that current K location, thus achieving the ultimate goal of skipping the processing and recording of redundant data via avoiding many unneeded traversals of K.

A current K location is established by a set of node pointers, i.e., addresses that point to locations of a node in a K Store. In the preferred embodiments, one node pointer is used for each level of the K structure to accurately locate a K location.

There are several ways to add information into the incoming data stream which we describe with reference to column identifiers in U.S. patent Ser. No. 10/975,223 and for inserting data source repository IDs in Ser. No. 10/965,332, both filed on Oct. 28, 2004. Such mechanisms are taught here to be useful to insert new control characters that are useful in directing the building of a KStore; as contrasted with incorporating information into a KStore as was the case for the two just mentioned prior patent documents. What is different here is that these control characters will not be inserted into the KStore (in presently preferred embodiments), instead they will be used by the Learn Engine in a scratch-pad memory area for the Learn Engine, to more efficiently build a KStore.

For example, in one preferred embodiment, a <Ctrl-S> or Hex 0x13 (or some other special character if desired) is used to designate that the current K location pointer should be marked for reuse and <Ctrl-R> or Hex 0x12 (again, or some other special character if desired) is used to designate that the current K location pointer should be replaced by a previously marked K location pointer. There are several specific ways to add in such special characters for the field record universe of data, and there are other, similar ways it could be done for other data like image files, sound files, or other data types to achieve the savings in processing, and rid our systems of the unneeded redundancy we are seeking to avoid.

For field record universes we describe partial field reuse and partial record reuse in some detail, however, the teachings of this invention can be applied much more broadly to any situation wherein a data stream has a significant set of data that has points of reference within it. In such situations, whether it is an image, a file of many images, or sound files, or even mixed data types having organizational points of focus, it is clear that a reduction in traversals will be helpful when incorporating a large amount of particles. A reduction in traversals to avoid redundant processing and traversals will save time and processing activity for any kind of data type.

The node reuse we describe can also be used at any level of K, its use is not restricted to a single level.

We describe the generalized KStore structure and functions in general in the rest of this summary, and briefly describe how this invention is structured within that set of concepts. As is described in earlier filed patents on the preferred mode of interlocking trees datastore, (the varieties we use often called a "KStore") each level of the tree-based datastore comprises a first tree that depends from a first root node and may include a plurality of branches. The first root may represent a concept, such as but not limited to, a level begin indicator. Each of the branches of the first tree ends in a leaf node or end product node. A second root of the same level of the tree-based datastore is linked to each leaf node of the first tree that represents an end product. Hence, the second root is essentially a root to an inverted order of the first tree or subset of the first tree, but the first tree is not duplicated. The second root may represent a concept, such as but not limited to, a level end indicator. Finally, the tree-based datastore comprises a plurality of trees in which the root node of each of these trees may include data such as a dataset element or a representation of a dataset element. This type of root node is referred to herein as an elemental root node. The elemental root node of each of these trees may be linked to one or more nodes in one or more branches of the unduplicated first tree. The non-root nodes of the tree-based datastore essentially contain only pointers to other nodes in the tree-based datastore, and may contain additional fields wherein one such additional field may be a count field. The roots of the trees in the forest of trees comprising each level of the tree-based datastore are also comprised of pointers, however the root nodes may, in addition, contain data that represents information (i.e., contain data that is or represents data such as dataset elements or concepts such as level begin or level end indicators); all the other nodes of the tree-based datastore only point to other nodes and contain essentially no data. As an example, the data may be an integer that is associated with a character, a pixel representation, a condition such as begin indicator, end indicator, beginning of field indicator or the like, although the invention is not so limited. Multiple levels of the above-described tree-based datastore may be generated and accessed; the end products of a lower level becoming the elemental root nodes of the next level. The structure of the nodes themselves is generally maintained through a limited set of data fields per node. There are fields for the Case, the Result, the asCase list pointer, the asResult list pointer and additional fields including at least a count field in most forms of the structure, as well as a value field for each elemental root node.

BRIEF DESCRIPTION OF DRAWINGS

The foregoing summary, as well as the following detailed description of embodiments of the invention, is better understood when read in conjunction with the appended drawings.

For the purpose of illustrating the invention, there is shown in the drawings exemplary constructions of the invention; however, the invention is not limited to the specific methods and instrumentalities disclosed. In the drawings:

FIG. 6 is an example of a tabularized record set of sales team activities;

FIGS. 11A-C illustrate an index (12A) and data before and after a pre-particlization step (11A and 11B, respectively), where Marks and References are inserted in accord with a preferred embodiment.

DETAILED DESCRIPTION OF PREFERRED EMBODIMENTS

Figure 1A:
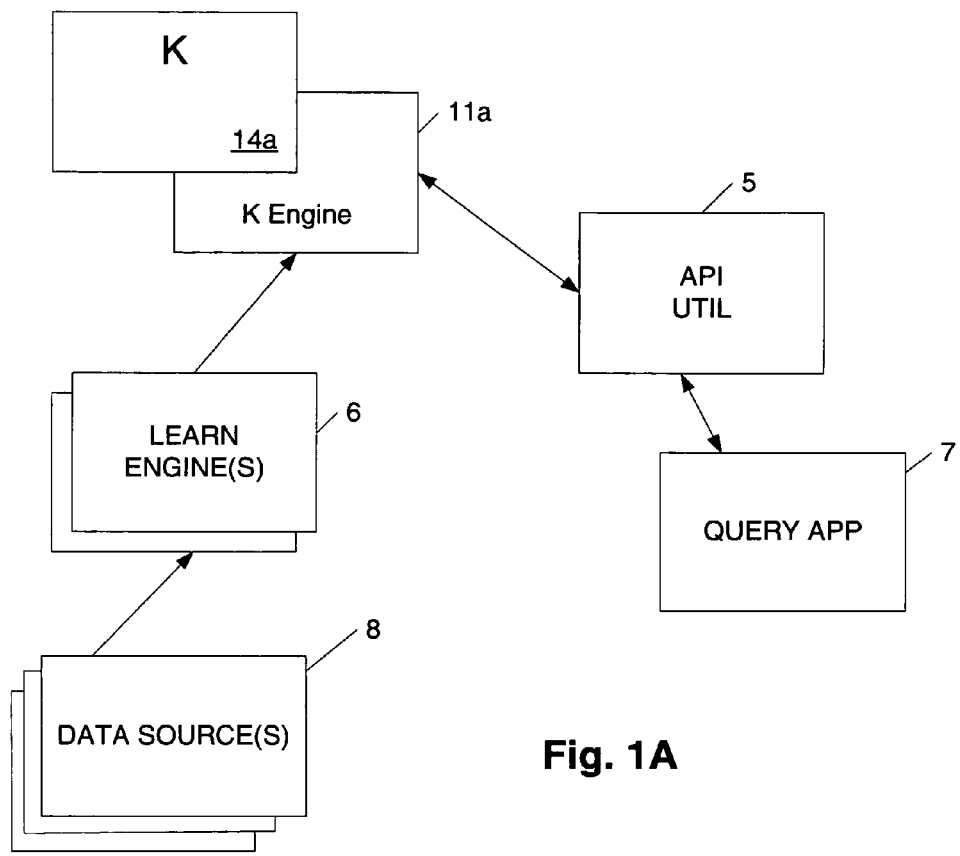
FIG. 1A is a block diagram illustrating an exemplary computing system in which aspects of the invention may be implemented having an interlocking trees datastore K in a computer memory (memory not shown) and components that support such a K in a system.

FIG. 1A illustrates a KStore 14a in a preferred embodiment environment in which a K Engine provides the only connection of the K 14a to the rest of the world. (It should also be noted that there can be more than one K Engine, similar to the one K Engine 11a in the illustration, providing access to the KStore 14a, although it is easier to see in an illustration using just one. We could also be feeding multiple KStores as well). In turn, the K Engine 11a is addressable by software entities such as API Utilities 5 and Learn Engines 6 (of which there could also be more than one). The Learn Engines and API Utilities manage and handle threads in cooperation with the resources of a computer system (not shown) in which they operate. (Typically, the computer system will be a server although we have used a single Personal Computer in some implementations of K.

The outside world, in our preferred arrangements has access to the KStore itself only through these API Utilities and Learn Engines, which in turn access the KStore through the K Engine. The API Utilities and Learn Engines, are accessed by the outside world through an applications layer. Software applications such as GUIs, databases, and any other type of program or interface which could provide data or request information can be hosted in this applications layer.

FIG. 1A illustrates the structure but is drawn to avoid the explicit delineation of threads and layers, to indicate to the reader that the hosting environment is inherently flexible in its nature.

The applications layer will have the various data sources 8 and the query applications 7 that use the just described systems to access and use the KStore 14*a*. This applications layer can be distributed across the internet or a local network, or local to the computer system in which the K is present.

Figure 2:
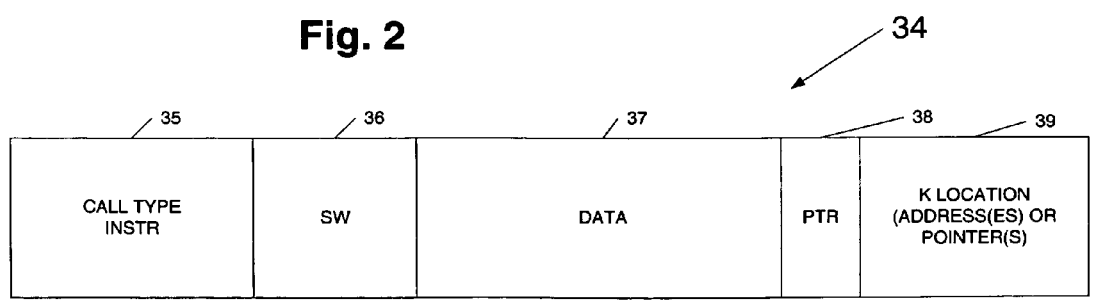
FIG. 2 is a block diagram of a message packet in accordance with a preferred embodiment of the invention.

Calls themselves, that is, the requests from the Learn Engine and API Utility objects can be very simple statements or even instruction words. The quickest way to see this is to illustrate it as an instruction word or message 34 of FIG. 2. As such (we use the concept of the instruction word for purposes of a teaching illustration) the instruction word could have an instruction type (Call) 35, but in most embodiments this is not needed because the K Engine will return a K location regardless of the purpose of the call. The message will preferably have a switch component 36, but in many embodiments, switches can be set for the K Engine elsewhere. The message does require a data particle 37, suitable to be brought into relation within the KStore. By this suitability we mean that the particle must be something the particular KStore can recognize. It would be preferred that in deciding what data to use as a Mark or Reference, the designer (using the invention claimed in this patent) decide on characters or symbols or other particles that are not going to be recognized by the KStore. In other words, if the KStore is only able to understand ASCII text particles and the information in the data particle section 37 of the example data word 34 is not an ASCII character, there will be an inability on the part of the instance of the call handler spawned to learn this particle to accomplish its task, and the call handler should generate an error signal to return to the Learn Engine in such an instance. This would make it easy to pick something not represented in ASCII since it will not be a member of the acceptable particle list and can thus be easily found by the Learn Engine when it is looking for Marks or References. Likewise, if the API Utility sends a request to find a particle in said ASCII-based KStore that is not in ASCII, an error indicating something like "not found" would preferably issue, responsive to such a request. (A further discussion of particles qua particles, characters, pixels, or other quantum-like components of information is found elsewhere within this document). Still using the instruction word analogy, the message or particle message to the K Engine should also have a return address section 38 that indicates the source of the request. This will preferably be generated by the Learn Engine to indicate that the acknowledge or error signal should be returned to it (along with some kind of trace so it knows which particle in a particle stream caused the error). If the call came from an API Utility, the return address section would be used to track where the API Utility got its query from (i.e., from which thread and where among the parts to this thread this call came) and to which this call is a part of the solution. (By part we mean that it may be a focus particle or a constraint particle to be used together to solve the query, or part of some larger query requiring several constraints or foci.) Finally, we should have a pointer 39 included in the instruction word 34. This pointer 39 will have the K location address(es) or pointer(s) needed to communicate the current location in the KStore. The first particle and current K location combination, in any new KStore may be interpreted by the K Engine as a call to initialize, i.e., set the current location counter to the BOT node. A simple signal could be the presence in a particle of a set of null values for the current K location pointer which could be used as a call to initialize, but many variations on this will occur to one of ordinary skill using this invention without stepping outside the ambit of this invention.

The K location in the KStore is very important to the implementation of this invention. It is used by the invention when returned from the K Engine to "fill-in" the chart of K locations needed by a Learn Engine to establish the location of Marks and References. It is placed into the message to the Learn Engine with the particle in order to identify to the K Engine where the next particle will be recorded. In this way, the K Engine is used to establish where this next particle is being recorded with a Learn Engine supplied K location, which is actually pointing to a different location then the last returned address; i.e., the K location of the Mark.

The Learn Engine basically provides an interface and translation and particlization functions to enable the K Engine to receive particlized data to learn. Thus it must be able to process appropriate protocol, transport, and translation capabilities to receive input from the expected data sources, whether they are XML, Oracle, DBMS or whatever, whether they are from static or streaming sources, or even external event-triggered real-time sensor sources. Of course the particular embodiment may be geared to handle any subset of such inputs. It needs also to be able to translate the data from such sources into appropriate sized chunks of data that can be readily particlized to fit with the expected data particle formatting of the KStore, and it should have a particlizer to send such particles to the K Engine, and any buffering as appropriate may be added. Accordingly, metadata input from whatever data sources are expected by the Learn Engine, and this metadata may be used in designing the appropriate placement of Marks and References in the input data stream.

As should be apparent by this point, and well understood by readers in these fields of endeavor, each of these functions and components of KStore systems can be distributed across the computer systems and networks as desirable to effect the most useful form for the particular application the user may be building or use to which the KStore will be put.

As we have described in earlier patent documents referred to above, the learn function, in preferred embodiments, is enabled through what we refer to as a Learn Engine, and this Learn Engine has various component parts that perform functions of recognizing, breaking down and reconfiguring data input so that it is appropriately formed for being recorded as events, that is, brought into relation, in the KStore. Because what we are doing in this invention is inserting Marks and References into the data sequences from the data source or sources, we think that it is useful to consider the data sources and the form the data can take prior to such a discussion covering the Learn Engine.

Particularly it should be recognized that the data may come in pre-ordered or non-pre-ordered forms. For example, in a field record universe of sales records, where the sales records indicate numerous purchase transactions from a single purchaser, the fields of those records that were variable would be less than all the fields of the records. We assume for this example that each record has information about the purchaser. Thus each transaction record about such a purchaser will have at least some common variables with equivalent values. If the source of the data for KStore has the data pre-ordered, the redundant fields may be sent to the KEngine, first and only once, and the variable fields following, without the redundant fields being re-sent. For example, for two purchases, a pair of data records might look like this:

Name;Jonathan Apple, Address:1407 Lightning Lane, Winthrop IA, Phone, CustID19993654, fields only once, then all the purchase data could arrive after . . . item:2987, price:

3.49, volume:1, storeloc;Cedar Rapids;; item:a98, price: 15.87, volume:2, storeloc:Cedar Rapids.

The same two records in a non-pre-ordered input data stream may look like:

Name;Jonathan Apple, Address:1407 Lightning Lane, Winthrop IA, Phone, CustID19993654, item:2987, price:3.49, volume:1, storeloc;Cedar Rapids;; Name;Jonathan Apple, Address:1407 Lightning Lane, Winthrop IA, Phone, CustID19993654, item:a98, price:15.87, volume:2, storeloc:Cedar Rapids.

Figure 3A:
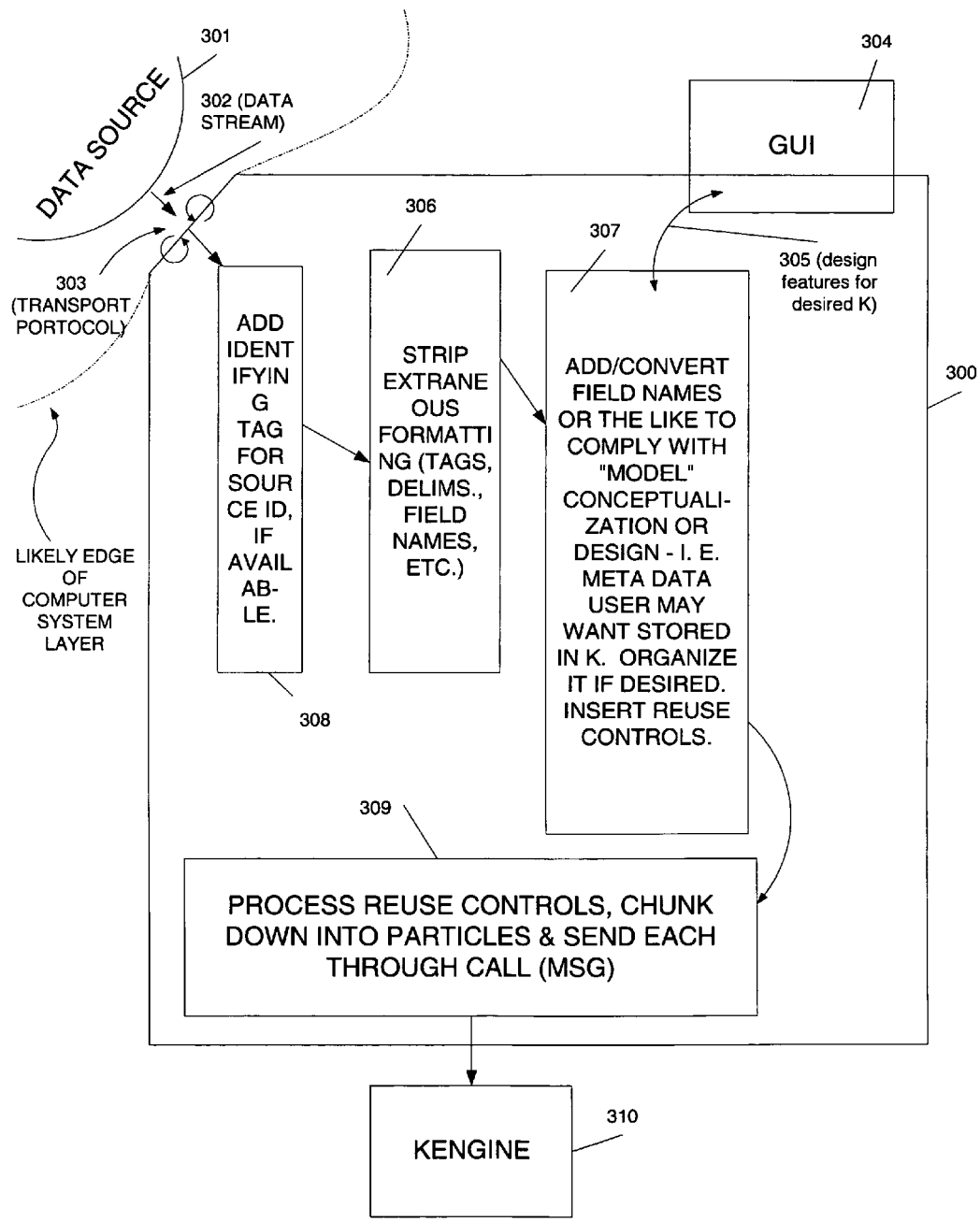
FIGS. 3A and 3B are block diagrams illustrating Learn Engine and its components in two preferred embodiment forms.
Figure 3B:
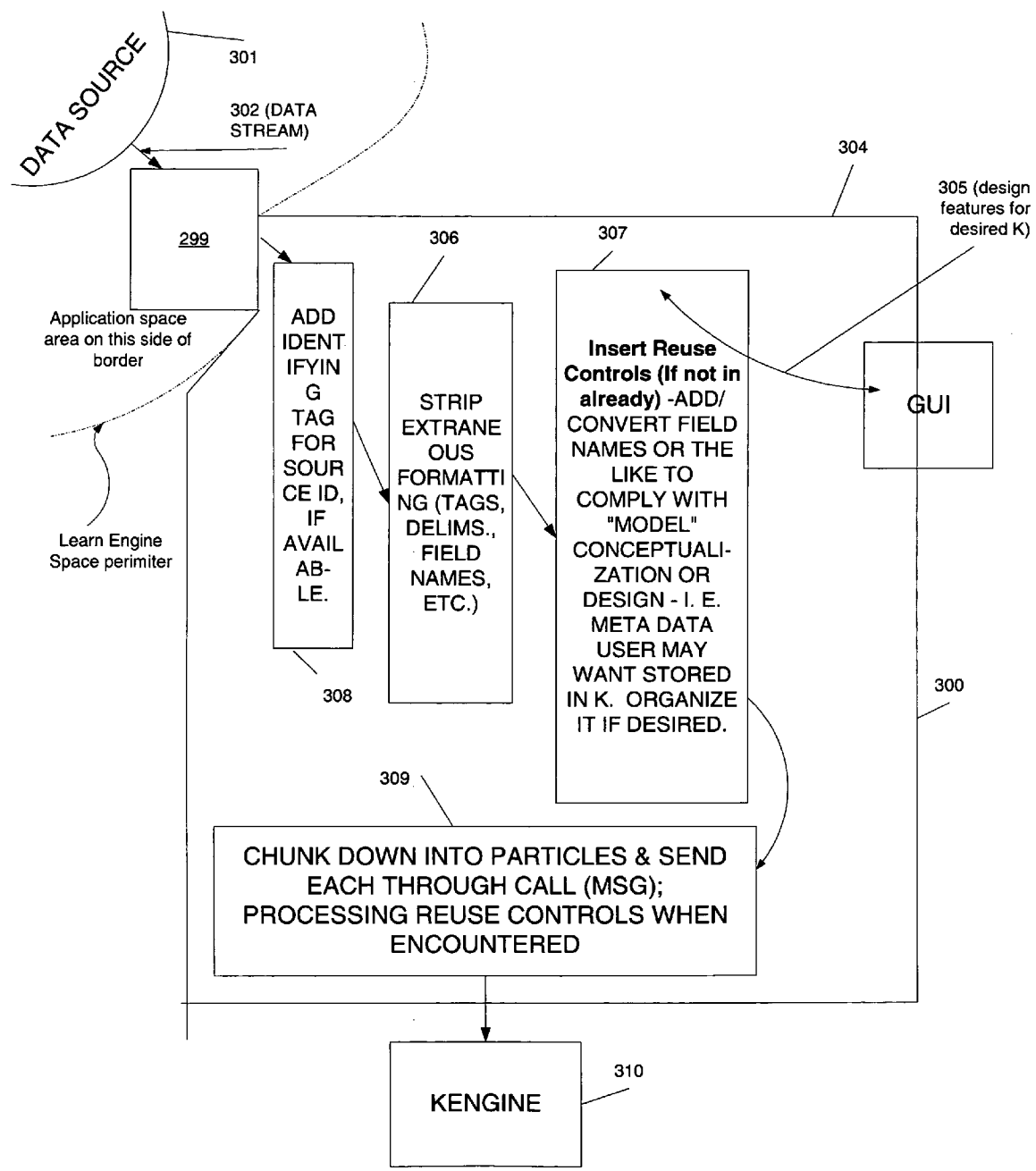

Refer now to FIG. 3A in which a preferred embodiment of a Learn Engine 300 is illustrated, handling a stream of data 302 from a data source 301. The data stream is received through a transport mechanism with associated protocol, in most cases probably from an external source computer system (not shown, but in area 301), across a communications medium (not shown) such as the internet or a local network to the computer system (also not shown) in which the Learn Engine 300 is functioning. Along with the Learn Engine, the K Engine 310 as well as the KStore data structure (not shown), may be functioning, or they may be in separate computers appropriately linked together to enable the communications and processes we discuss. FIG. 3B shows an alternative structure that can be used and how it functions will be described with reference to that figure below.

Whether the Learn Engine is receiving pre-ordered data or not is our first question. The incoming data stream may have metadata in it that says it is pre-ordered, and those incoming records may even have control characters inserted therein indicating where the records are the same and where new field variable groupings are.

If the incoming data does not already have the control characters inserted they may be inserted in the Learn Engine, consistent with metadata and where that metadata suggests the control characters should go. The Learn Engine should be sensitive and responsive to the metadata. This sensitivity/responsiveness could be built in a preconfigured way, or could be established or configured via communications through the GUI 304 from an applications developer or from an application program that has similar configuration access to the Learn Engine. It is essentially a matter of design choice as to which component inserts the control characters, but to coordinate this inventive activity, the Learn Engine needs to be prepared to handle whatever form of data it will be receiving.

If the incoming data is not pre-ordered, the Learn Engine could be configured to find the common field variables, order them and insert Marks and References in the records around such common field variables as needed. Metadata or GUI configuration may be used to configure the Learn Engine to handle this too.

Thus, the input data stream 302 from data source 301 may be in any of these several forms just mentioned, and the Learn Engine should be responsive to the form.

Because the data can be embedded in XML envelopes or other transport mechanisms, it will be expected that the transport protocol issues are resolved and that the data passes through the transport protocol 303 into the Learn Engine 300. Any source ID tags or other information that may be added to the data may be inserted in component 307. A component 306 that may strip extraneous formatting data from the input data is preferred too. A component 307 may also add or convert field names or reorganize the record to comply with a known data model if desired. How these components are configured and function can be controlled through a GUI like GUI 304 which supplies 305 design features for the desired K to result from this input data stream.

In any event the preferable form of the Mark or Reference will be a control character preferably followed by a one-byte index (1-255) that identifies the particular instance of a K location. This assumes that there will be less than 256 likely instances. In KStores or applications where that may not be true, a larger (or smaller) location pointer instance identifier may be preferably used, but this one byte should do for most common field/record database data in use today. Alternative Mark and Reference characters can easily be designed to accommodate any data type or file size. Regardless of in which component or stage this set of Marks and References is inserted, this Mark and Reference information will be processed during the data particlization in component 309, the information about which addresses or references to use will be processed in the particlization component in preparing the particle messages for the K Engine. By processing this information in the particlization component, the appropriate "current location" in K can be put into the particle message to save the redundancy of additional traversals we discussed as the reason we created this invention.

Thus, any Marks and References will be embedded within the data stream being formed as a series of particles-to-be, but will be removed prior to actually forming the particles into messages. Before we detail how that happens please refer to FIG. 3B in which a Learn Engine 300 is also shown, however this one having an associated filter or ETL component 299 associated therewith between the Learn Engine and the data source 301.

FIG. 3B is very much like FIG. 3A, one difference being the inclusion of a component 299 in the input data stream, outside of the Learn Engine. Component 299 receives the input data stream 302 first, and forwards it on to the Learn Engine. The location of transport activities can be split between the component 299 and the Learn Engine. Generally this component 299 can operate as a filter or ETL component and is discussed in greater detail below.

By organizing the data stream through either component we ensure that the locations in K of each node in a Case path for a record/sequence will be assigned based on this organization. The recording of a Case path is, after all, the traversal/creation of nodes in K from a BOT node to an EOT node as the particle messages are broken down and are recorded by the K Engine. Thus a current K location from a last node traversed/created will provide a set of K node pointers, i.e., the current K location of the last particle traversed/created, and if a Mark followed the sequence being particlized, the presence of the Mark signals to the Learn Engine to retain or capture that K location for any References to that Mark. If a Reference appears in such as string, the Learn Engine is built to know to retrieve the corresponding Mark K location, and to reuse that location as the current K location by replacing the current K location with it, for use by the particle message.

There are some limitations here. Note that use of this invention does not automatically account for updating of the count fields from the BOT to the after-Reference particle in the sequence to be incremented. This is because we have taken this shortcut to eliminate not only the particlization, but the processing to traverse the path to the EOT when recording this sequence. However, the additional processing required is simple and straightforward. If all nodes generated from a sequence such as this have their count fields incremented when the EOT node is reached, that is sufficient processing to properly update all counts for all variables or nodes prior to the Reference. This can be done at the end of processing of a Case path.

If a Mark from a previous data stream that is going to be associated with a new data stream, came from a different database with different field names or Mark numbers or name, these identifiers may be changed or regularized or otherwise made consistent, preferably in component 307. Likewise, if a different kind of database was used in the creation of the KStore using the earlier data stream, a field name may come after rather than before the data in the other database, for example, so this arrangement should be mimicked at this component in order to make the data consistent. It is not necessary, but it makes working with KStores easier to do so. There are alternatives such as creating a related structure within the same KStore by ignoring the differences, but it seems at this point to be efficacious to regularize the data streams, or, in other words, clean the data. Control over this data cleaning or regularization will preferably be obtained through a GUI 304, wherein design features that are desired are conveyed 305 to the component 307. Ultimately, of course, the field name or other identifier can be appended to each field variable so that the column or field name can be found associated with the variable in the KStore. However, the Mark or Reference control character and/or code will be left out of the actual particlization process, because we don't have any current reason to want to send these to K.

Whichever component of the Learn Engine does this regularization it is preferably the component that puts the information about the Mark (the preferably one byte code mentioned above), into some location in a memory accessible to Learn Engine processes.

If a Mark from a previous data stream that is going to be associated with this new data stream came from a different database with different field names, the names may be changed at this stage in this component 307, and appropriate reference character codes added. Likewise, if a different kind of database was used in the creation of the KStore using the earlier data stream, the field name may come after rather than before the data in the other database, for example, so this arrangement should be mimicked at this component in order to regularize the data. There are alternatives such as creating a related structure within the same KStore by ignoring the differences, but it seems at this point to be efficacious to regularize the data streams, or, in other words, clean the data. Control over this data cleaning or regularization will preferably be obtained through a GUI 304, wherein design features that are desired 305 are conveyed to the component 307. Ultimately, of course, the field name or identifier can be appended to each field variable so that the column or field name can be found associated with the variable in the KStore. However, the marker or reference character or code will be left out for the particlization process, and the references will be associated with the particles in messages sent to the K Engine. Whichever component of the Learn Engine performs this function puts the information about the Mark (its K location) into some memory location accessible to the Learn Engine process. The storage of Mark and K location data will preferably be organized to form a table or array, such that a Mark control character and code will have a location in K (or a location to keep an address when one is available such as to support virtual addressing of K). Associated with the location in the array can be any References dependent on that Mark, or they can find the reference by the way they use the array. Thus there will be at least a Mark and address entry. The address could be a real or a virtual K address, depending on the level of security desired. Thus, the Learn Engine, if an intermediary is set up between it and the K Engine, may keep referencing addresses for real locations in K so as not to be able to pass them to harmful programs that might alter the K inappropriately.

Next, a final component 309 in the Learn Engine breaks the data into particles, processes Marks and References if present, and creates the messages for K Engine, with the pointers (current addresses in the messages) indicating to the K Engine where to record the particle event. In this step, one should notice that the particle stream may have (preferably, if we are working with field record data, but not necessarily) first a field name, number or other identifier to identify the field variable that will follow, then the field name delimiter. If there is no field name or other information identifying what field or column the particle belongs to then the particles that make up the field variable will be sent to the address within K indicated by the pointer information (if any) derived from the Mark or Reference data, and this will continue, until the record is completely particlized. From here, the particles are sent to the K Engine to be recorded as events in K.

As should be apparent by this point, and well understood by readers in these fields of endeavor, each of these functions and components can be distributed across the computer systems and networks as desirable to effect the most useful form for the particular application the user may be building or use to which the KStore will be put.

As mentioned above, another preferred embodiment, a variation of the Learn Engine example of FIG. 3A, is illustrated in FIG. 3B. This figure uses the same numerals for the same structures as does FIG. 3A. However, in this embodiment, we add a component 299 that is outside of the space for the Learn Engine 300. This component 299 receives the data stream 302 from the data source, and it provides an additional layer of flexibility to the system. It may be an ETL (Extract, Transform and Load) component, a filter component or other mechanism to evaluate the incoming data stream and make desired changes to it such as eliminating or modifying certain variables, fields, delimiters or the like, parsing XML into data useful to the particular KStore as identified by a user of the component and Learn Engine, and, most importantly for this invention, adding in information for each sequence or record from the repository or data source into the data stream that the component 299 will forward to the Learn Engine 300. Most preferably, the component 299 itself will incorporate such an ID into each field of each record or sequence received from each source. There may be a different value for each repository ID that corresponds to each different data source so that a given data source will have a unique repository ID, and this can be used to determine the names or identifier for columns from each such repository, as well as Mark and Reference character codes. The Learn Engine transport protocol would then treat the output from component 299 as output received from any data source. Thus, the field name schema corresponding to an ID for the source can be incorporated into each record sequence sent as particles by the Learn Engine into the K Engine 310, and the Mark or Reference codes identified and processed by the Learn Engine. Note that the component 299 is in the applications space rather than in the Learn Engine space. This is relevant because it allows for it to be more easily controllable or configurable via applications and application developers. However, the addresses within K are not put into the applications space, but remain in the system space memory areas associated directly with the Learn Engine.

Thus, the configuration as to what data may be desired (or not) from the incoming data stream and how to accept such data, as well as how to organize the data before sending it to the Learn Engine, and the other adaptations we discuss, can be configured by the application, the developer, or the manufacturer or distributor in a predetermined or dynamic way, as may be desired for the given instance.

Likewise, a plurality of Learn Engines could operate simultaneously with respect to a single K, and each Learn Engine could supply a source ID for each source it receives data from, which could be used to determine column identifiers for all data records from such sources and Mark and Reference information could be ascertained in the same way from each source so that for example, the same column information from different sources could be used for the same Mark or Reference or unique Mark or Reference information may be maintain for each source. The records from the various sources could thus be supplied with Learn Engine particles send to a K Engine for that single K, without any change in procedure or structure from what we discussed above, so long as one coordinated the identity indicators for the sources to ensure consistency across sources, if that is the goal. A component like component 299 could also perform this function.

Figure 4A:
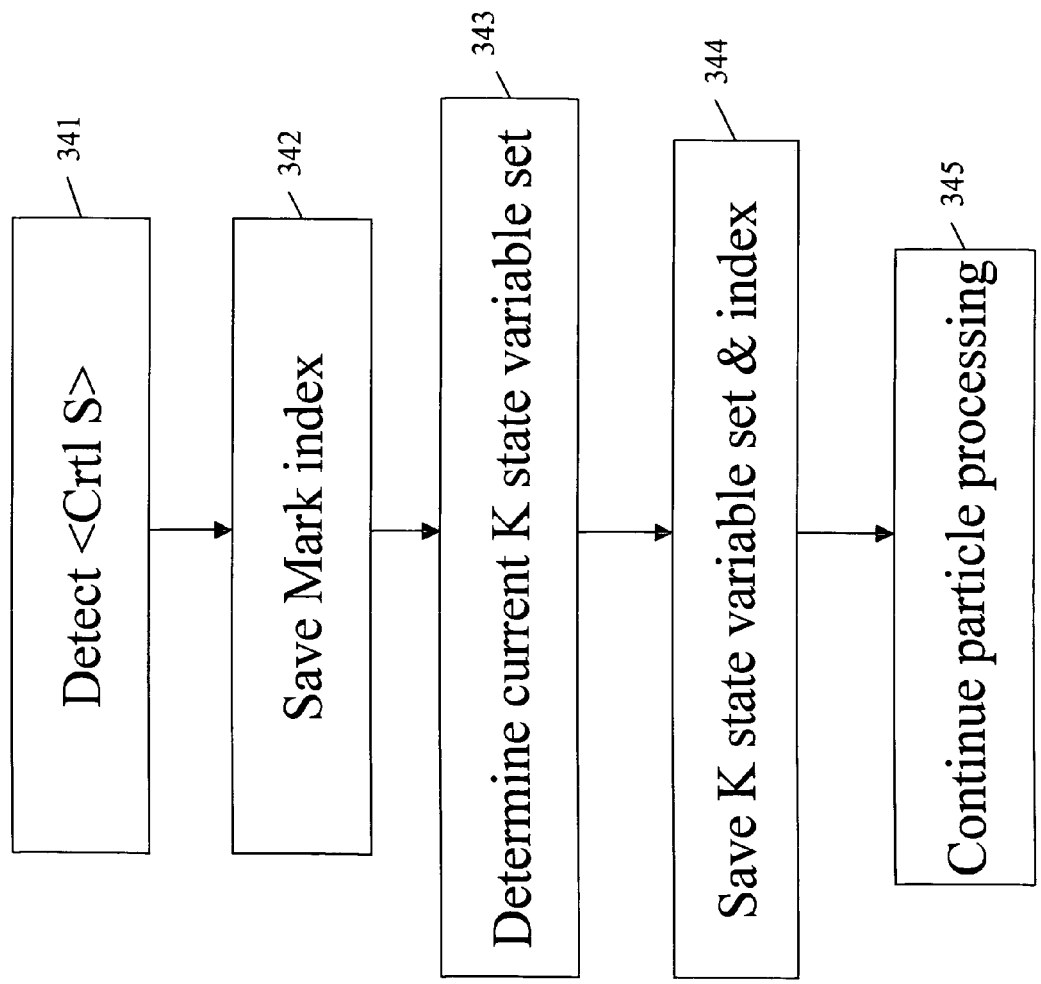
FIG. 4 is flow chart of the processes a preferred embodiment Learn Engine exercises to handle the inventive concepts described herein.
Figure 4B:
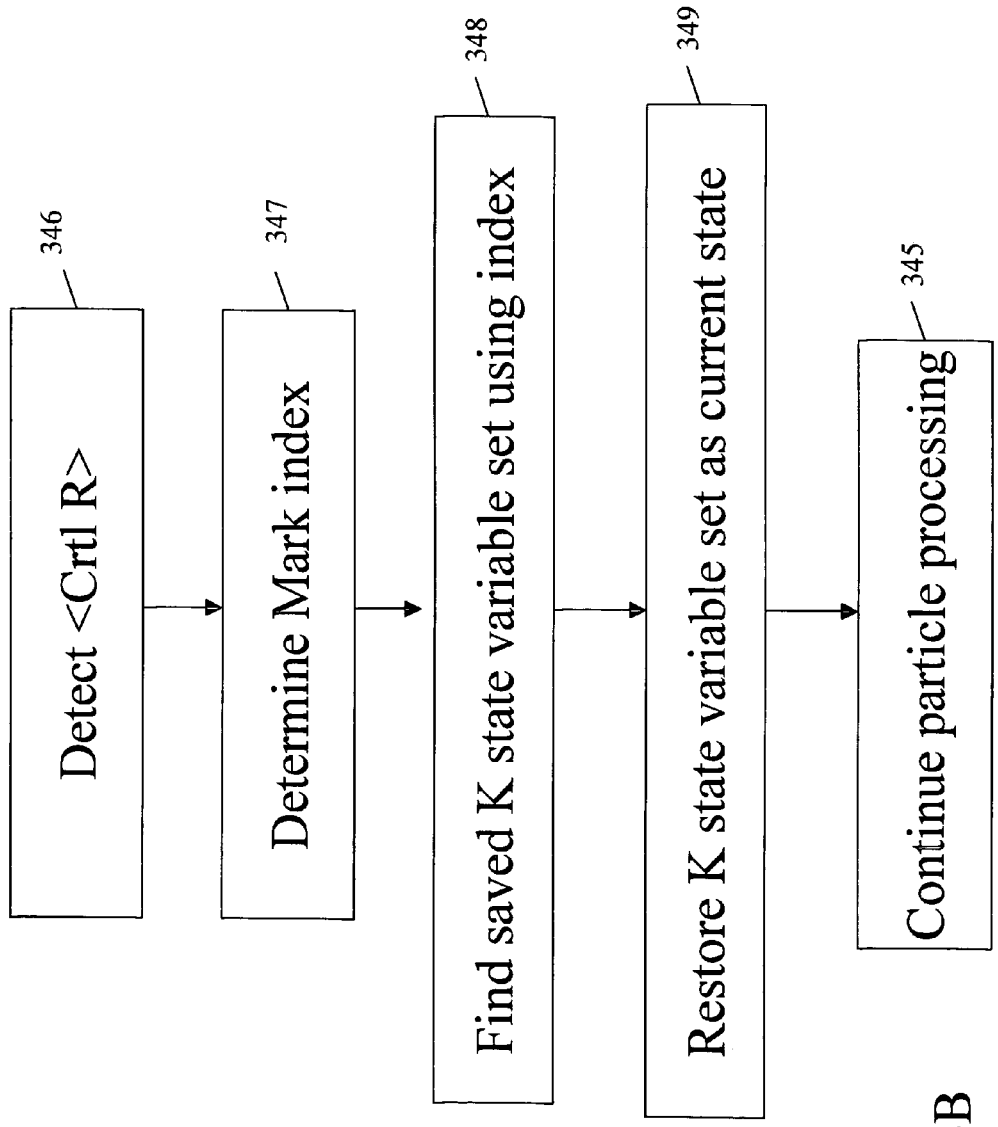
Figure 5:
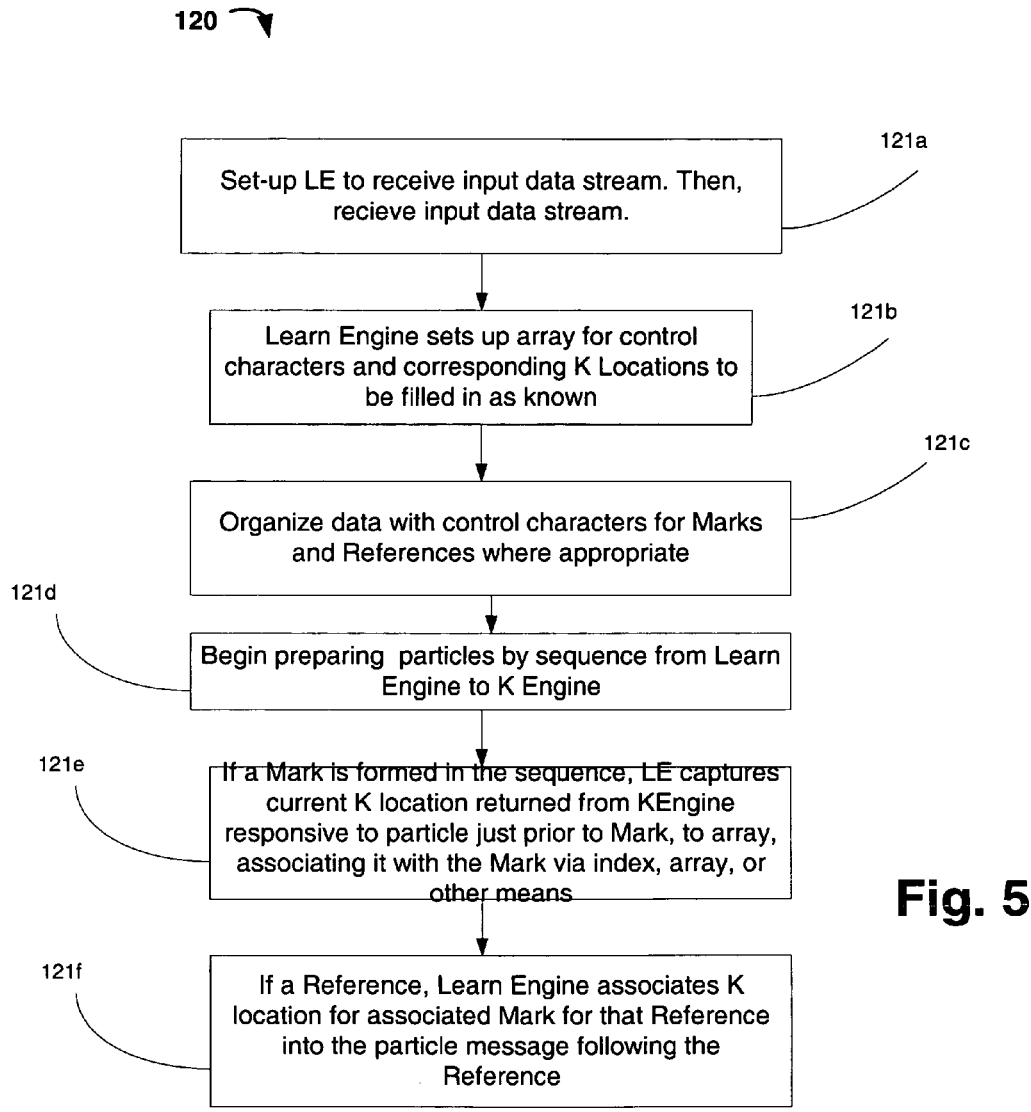
FIG. 5 is another flow chart describing the processes for using the Marks and References of this invention in the learn function.

The flow chart 120 illustrated in FIG. 5 shows the operation of the two processes described in more detail with reference to FIGS. 4A and 4B later, with FIGS. 4A and B showing two processes working together within the context of the Learn Engine. The first part of the example processing of data through a preferred embodiment Learn Engine is the set-up of the Learn Engine to receive the data from the input data stream, then receiving it 121a. Next, or within the set up arrangement, the Learn Engine sets up the array or arrays or tables for the pointers to K locations that will be filled in as Marks are encountered in the data. The Learn Engine then processes the incoming data, and may place control characters for Marks and References within the data stream 121c. When particlization begins 121d, the Learn Engine can set up the particles from the data stream and begin sending them to the K Engine. If a Mark is found during particlization, the Learn Engine captures the current K location that was returned by the K Engine responsive to the particle just prior to the Mark and stores the current address in the array, associating it with the particular Mark index 121e. If a Reference character is discovered, the Learn Engine refers to the array, using the Reference index, in its memory to find that Mark associated K location, to load into the particle message of the next particle 121f. In other words, the current K location is reset to the K location associated with the Mark specified by the reference. This loading of the particle message with a known K location allows the Learn Engine to control the traversal of K by the K Engine, to associate the new information in the particle at the recorded Mark associated node in K.

To better understand this process by using an example, refer to FIG. 11A where an array of K location is shown. Here we have places for Marks 0-n and a place for a field variable K node address and a record K node address for each Mark. As mentioned previously, a K node address is used for each K level. This K we are using in this explanation of the invention is recording records in a field/record universe, and therefore has 2 levels, a field variable level and a record level.

FIG. 11B shows 2 records to be recorded in K and FIG. 11C shows the data stream that will be used. A Mark, ^S1, will be inserted following the redundant data 'Bill Monday' in the first record. The redundant data in the second record will be deleted and replaced by the reference ^R1. So the data stream to be particlized is as shown in FIG. 11C During the particlizing process for this data stream, the redundant data 'Bill Monday' will be particlized and sent to the K Engine. When the Mark, ^S1, is encountered the current K location will be saved. The field variable K node address, 75900A01, and the record K node address, 75910B11, will be stored in the array, FIG. 12A, at the index 1. After the Mark has been saved in the array the particlizing continues with '130 sold NJ' until the Reference, ^R1, is encountered. When the Reference, ^R1, is encountered the K node location is reset back to the end of the redundant data 'Bill Monday'. When particlizing continues with '100 trial PA', the K Engine will depend '100 trial PA' from the redundant data 'Bill Monday' as though the data 'Bill Monday' was actually in the stream.

Figure 8:
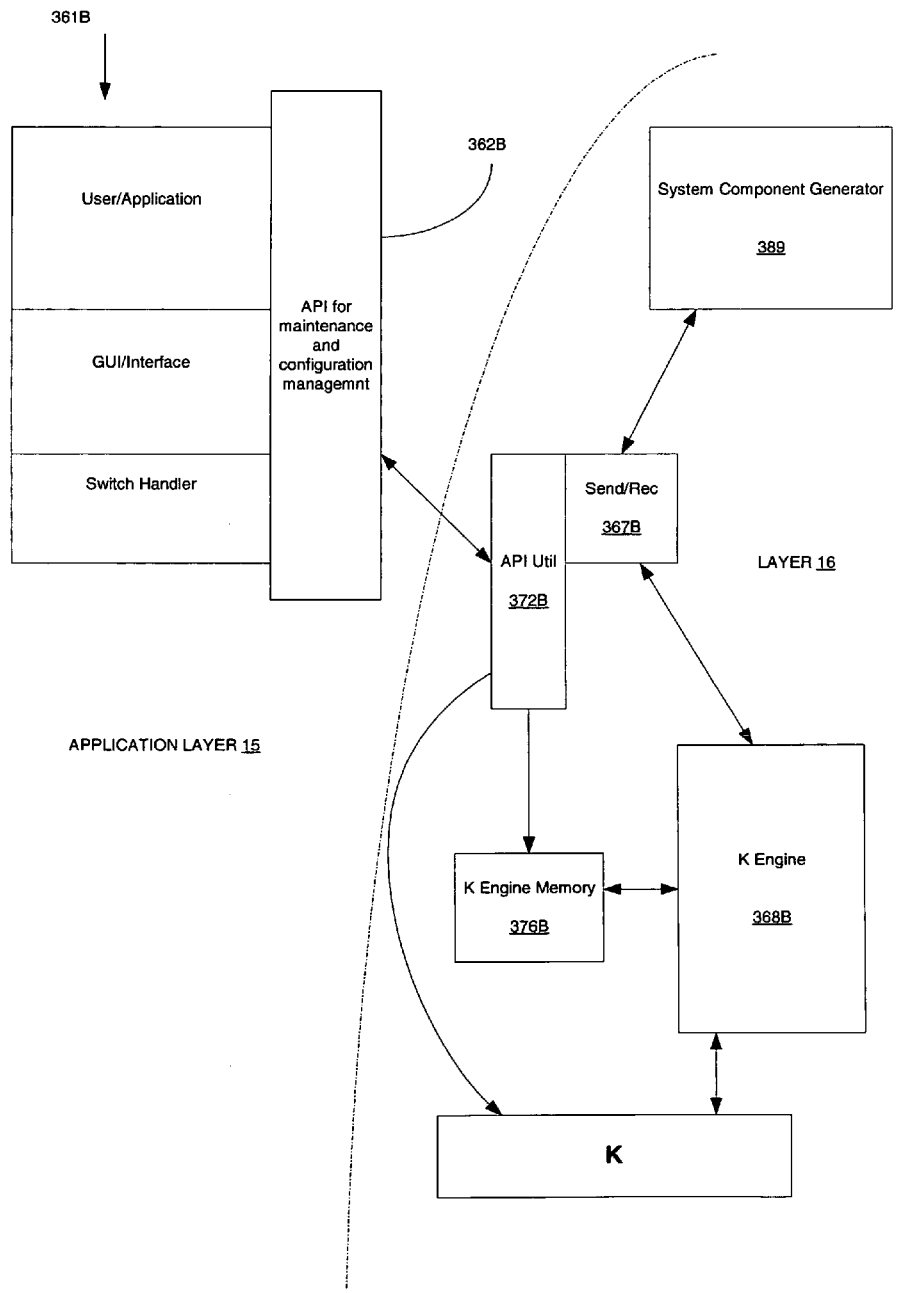
FIG. 8 is a block diagram illustrating an API function for maintenance in a KStore system.

FIG. 6 is a chart of data records from which these two could have come, and FIG. 8 is a node diagram illustrating what the nodes would look in K after learning from such a set of data as is illustrated in FIG. 6. Root nodes for Bill, Tom, 100, 103, PA, NJ, are not shown. In this small K, good places for Marks would be after Tom, after Bill, or after Bill Monday or after Tom Monday, because there is a branch after these node locations. This means that we could avoid traversals with particles representing at least B-i-l-l, and T-o-m, thus avoiding seven traversal processes (assuming we have alpha-numeric particle sensors in this K). Avoiding the particles from the Monday variable too would produce even more significant savings, yielding an avoidance of seven plus 6 traversals at each Monday branch.

We can look at the process of reuse in a different manner with reference to FIG. 5, flow chart 120, described above, which describes the reuse of addresses in K with reference only to what the Learn Engine does in steps 121a-121f. Here the Learn Engine sets up the table or array first, and then does the organizing of the data into a stream and insertion of Mark/Reference control characters as required. It should be realized that all the control characters may be set prior to establishment of any repository of data being connected to a Learn Engine. Thus the Marks could be set in a predetermined way prior to receiving any of the sequences from the data repository. Alternatively, the Learn Engine may sense when it has a branch through internal counting of column name information during the sending of sequences, and establish the Marks and Reference information itself. This can even be done automatically as will be apparent to those of ordinary skill in these arts. If the Learn Engine has an additional routine added to it, which reviews all returned current addresses, it will know when they are repeats of other current addresses. If we set one or more counters into such a routine, those return addresses that recur often can be set up as Marks, for the first of a pattern of returned current addresses, and as References for subsequent returned current addresses within a sequence after such an address as qualifies as a Mark. It is simple from there to automatically generate the array set-up and fill in operations described with reference to FIGS. 11A, 11B and 11C.

It should be understood that delimiters and other metadata such as field names/headers or record number indicators may be particlized as well within the data streams. This permits knowledge of the structure of the original data to be learned along with the data. Within the field/record universe, delimiters determine the end of a field variable and the end of a record, creating a field variable level and a record level in the resulting K. This particlization and learning of metadata will also be done within other data universes using different delimiter sets, and will create the varying levels within the different K types. The K location in any specific K structure then is given by a set of K node pointers, one for each level (or at least for each relevant level) of the K. This set of K node pointers represents the 'state' of K at a given time for a given function.

Figure 7:
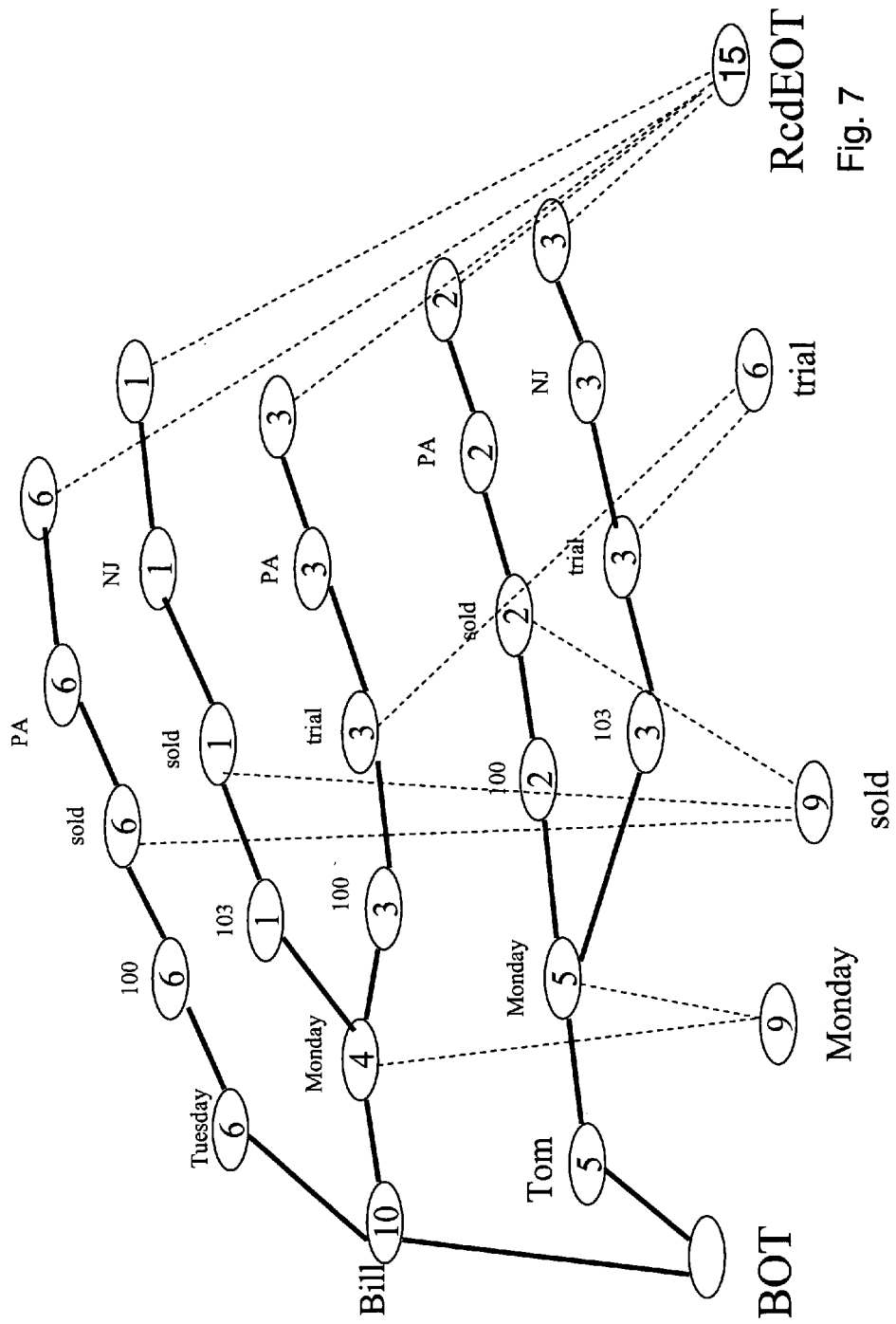
FIG. 7 a node diagram of the Kstore structure developed from the data represented in FIG. 6 is an example of a data stream with Marks and References inserted.

For example, establishing tables in K, in this case requires creating multiple branches from a particular K location, the Learn Engine may reset the K location for a previous to last position as the last position when it is creating a next message for the call with the next particle. The Learn Engine will have this data in its memory, such as memory 26a of FIG. 1B. To see how this operates on a field record data set more clearly, look at FIG. 7. At the node labeled Bill Monday, there are two subcomponent nodes which follow it, using Bill Monday as Case definitions. They append either 103 or 100 nodes. This is called a branch. If the Learn Engine knows it is going to have such a branch, it may save the K location of the Bill Monday node and re-supply it when it is supplying the second of the nodes 103 or 100. The way the Learn Engine saves the K location in preferred embodiments is by noting the branch with a Mark, the first time through. This K location is included in the message (FIG. 2) as the pointer address, which tells the K Engine where to position the particle that is the subject of the message. The part of the Learn engine feeding the data to the particlizer will have indicated that this is a part of a variable that is associated with a Mark control character if it is the first time that this branch is taken, or with a Reference character if it is any time after the first time. Generally this will occur at particular points in the data.

Partial Field Reuse or Partial Record Reuse for Field Record Universe Data.

For Partial Field Reuse, typically records will include the field name information as part of the field variables, and may be formatted as follows—Sales=Bill,Item=Desk, DayOfWeek=Friday. The 'fieldname'=portion of the field variables (i.e., Sales, Item, DayOfWeek) would be constant while the variable portion following the 'fieldname'=would be subject to change for each new record received. An application program calling the Learn Engine may want to reduce the amount of data to transmit to a K Engine to build a KStore. As we said, the Learn Engine can reduce the number of particles it has to send without reducing the information presented to the K Engine by designating the K locations of the K nodes for the 'fieldname'=portions of the fields, to be K locations that will be re-used each time a record is received and particlized to be transmitted to the K Engine by supplying information about the field with the variable. To accomplish this, an application program in one currently preferred implementation uses a filter application (component 299 of FIG. 3B, for example) to insert the control codes into the input data stream for the Learn Engine. The Learn Engine can be configured to do this with input from administrative GUIs or applications. Appropriately configured, the Learn Engine will insert into the first record the control character ^S with an index after each 'fieldname'=portion of the field. The serialized stream of data representing the record sequence would then look like the following (for a sales record): Sales=^S1Bill,Item=^S2Desk,DayOfWeek=^S3Friday.

The Learn Engine must set up the current K location, therefore it must keep track of the set of K nodes that define the K location and labels, that is, the K location and the index for each of the 3 'fieldname'=occurrences. Since the current K location is a parameter to the K Engine, once this is set up in the Learn Engine's memory, it can be used to send the address of the current K location to the K Engine whenever it encounters the control character(s) by checking a table in the memory of the Learn Engine corresponding each K location to a particular control character and code or index. Therefore, the remaining records in the file need only contain the control character ^R and indexes to re-establish the K location at the variable portions of the data for each field. Examples: For a first record: ^R1Sally, ^R2Chair, ^R3Tuesday, For a second record: ^R1Tom, ^R2Table, ^R3Monday In order to know what the K location is, the Learn Engine will send the first particle from the Mark control character to find the current location counter for that Mark, and it will establish a table in its memory for each Mark. The Reference control characters will indicate to the Learn Engine that it will go to the corresponding Mark to find the appropriate "current location" counter in K to which to send in the particle message which comes after that Reference character.

For Partial Record Reuse the process is very similar but slightly modified. To take an example, say the only field that changes in a given set of records is the Month field. Thus a record from the set could look like: Sales=Bill,Item=Desk, DayOfWeek=Friday,Month=Feb The application program inserts the control character ^S and index at the beginning of the Month=field in the first record: Sales=Bill,Item=Desk,DayOfWeek=Friday, ^S5Month=Feb The Learn Engine will record the K location and the index for the Month=field. The following records need only contain the control character ^R and index to re-establish the K location and the variable portion of the data for the Month=field: ^R5 Month=Mar.

In preferred embodiments we can apply this concept to multi level KStores as well. Before we describe this a description of a two level K structure is described with reference to FIG. 9.

Figure 9:
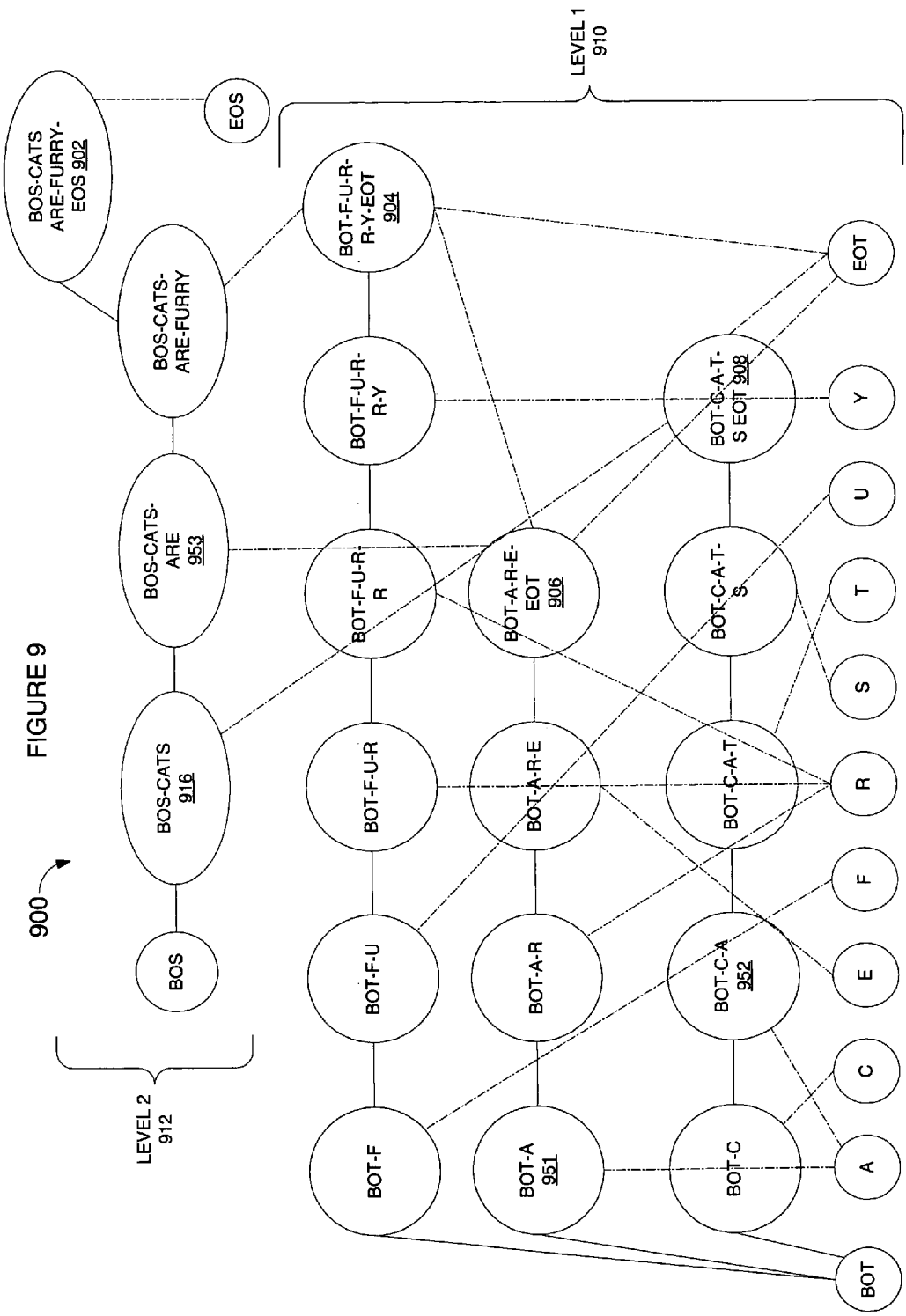
FIG. 9 is a node diagram of a KStore structure useful for discussion of particlization.

To be clear about particlization refer to FIG. 9. Note that in this K, it starts at a level of letters, and shows a second level of words. If all letters are "sensors" that is, they can be recognized as particles, adding each new letter allows for continued growth of the K. Submission by a data source would be by way of the three words in order, "CATS" "ARE" "FURRY". This K accepts letters as particles. Accordingly, the Learn Engine providing an interface to the K Engine for this K must produce letters as particles. A first particle is "C." The node representing this particle will be located within the elemental root nodes. To record this as an event the elemental root node for "C" will be brought into relation with the current location pointer in K, which in this case is the BOT (Beginning Of Thought) node. Because this is the first occurrence of "C", a new node will be created representing BOT-C. The next particle will be A, and it will be accompanied by a pointer to the BOT-C node. The K Engine will go through the asCase list and for each of the subcomponent nodes on the asCase list of the BOT-C node and for each node it will look at the Result node to see if it matches and use that subcomponent to reset the current location pointer. In this case there are no nodes in the asCase list and it will not have found a match, so the K Engine will record this event as BOT C-A, a new subcomponent node, and put this new subcomponent node on the asCase list of the original location counter. The new subcomponent's address will then be set as the new current location. More precisely, The K Engine will see that there are no occurrences of A following BOT-C in the current structure and that a new node will be required to record this particle event as BOT C-A. The next particle will be a T, and the record will be the new node presenting BOT C-A-T.

To explain the process by which this works refer to FIGS. 4A and 4B. Note that the Learn Engine calls the K Engine for each particle in the data stream. The act of the K Engine processing particles into the K structure requires the K Engine to maintain a current learn state (State Structure) that consists of an array of K node pointers. Each K node pointer in the array corresponds to a separate level in the KStore. K Engine also saves the level that corresponds to the level of the state array that was changed after K Engine completed.

The Mark and Reference processesing can be thought of as saving and restoring, respectively, part of the K Engine's state so as to position new knowledge to be learned more efficiently.

As the Learn Engine processes a data stream it will maintain a Learn Engine state array which is the set of indexes or Marks and K locations described with reference to FIGS. 12A, 12B and 12C.

The MARK process, FIG. 4A, within the Learn Engine begins when the Learn Engine encounters the <Ctrl S> or some other predetermined indicator for the MARK process.

After the MARK process indicator is detected 341, the MARK process determines a unique ID or index for this MARK 342. A particle or set of particles may directly follow the <Ctrl S> to be used as the ID or index, a counter may be used to create IDs, and there are many other techniques may be used to establish unique IDs or indexes for these Marks.

The Learn Engine will determine 343 the current state of K to be saved. This current state will contain as many K node pointers as required to allow the K state to be restored for the particular K being created. In the field/record universe a K node pointer for both the field variable level and the record level may be saved or just the K node pointer for the field variable array may be saved in instances where it is known that the record level K node pointer will remain fixed. In other K types the number of K node pointers to be saved vary by situations such as context, which K node pointers have changed, as specified by the K Engine, or whether some complete set of K node pointers for a particle K location are required.

The index will be used to position the current K location in the Learn Engine state array and the K location will be saved 344.

Then the Learn Engine continues processing the data stream into particles 345.

The Reference process, FIG. 4B, begins within the Learn Engine when the Learn Engine encounters and detects 346 the <Ctrl R> or some other predetermined indicator for the Reference process.

It then determines which Mark is relevant to or associated with the Reference 347. In accordance with whatever technique was used to create the unique index for the entries in the Learn Engine state array, the Learn Engine finds the required K location in the Learn Engine state array 348.

The current K location is then reset to the recovered K location 349.

The Learn Engine then continues processing particles from the data stream with the new K location in place 345.

Our preferred embodiment Learn Engines will reduce the size of data in the input data stream after stripping and adding and/or converting it in order to comply with predetermined information. Such predetermined information may be available to the Learn Engine through initial set up processes. The Learn Engine may be established with a set of switches kept in its associated memory area and accessible to an application or application programmer that sets up the Learn Engine's functioning with the KStore and the K Engine it will be working with. These switches will have information regarding the data sources it will be working with. Passing information about the incoming data can also be handled in establishing the protocol for communications between the Learn Engine and the data source(s). In any event, one purpose of such activity is to end up with the size of the particle matched to said predetermined sensor information that the K Engine and the KStore it is working with will accept.

Switches can be used to establish column identities (names, numbers or the like) that will be used with particular data input streams, and determine how particularly they should be handled (i.e., what delimiter to use, what kind of data to expect and the like), and whether Marks and References are to be noticed and used by the Learn Engine. In more aware systems, the switches or similar controls will allow the Learn engine to make its own determination of what identifier should be used whenever it recognizes that a field record data stream is being received.

In preferred embodiments, we have two types of API Utility components to the typical KStore system. One, an administrative API Utility component, is for maintenance, initiation, and change function support, which enables the user or a program to modify the various system components such as, by setting switches, state variables, designating data sources, modifying metadata or doing other things of an administrative nature. These settings that may for example control the functioning of a K Engine responsive to particles that may be on its sensor list. One such example could be designating certain particles as delimiters where a K Engine is expected to be responsive to a Field/Record universe of data. They may enable the user to initiate a second K Engine for accessing a single or more than one KStore within the system. Another function that may be handled in this way is the establishment of form and meaning for metadata in an input data stream or in a set of queries from particular query sources. This administrative API Utility type may be used to name particular KStores, to save them to long term storage, to return them to active system memory, in short, to accomplish any function other than the actual particle by particle message passing call operations of the system or query resolution. An illustration of a preferred embodiment of this administrative API Utility is pictured in FIG. 8. The other API Utility type is used for queries, and is not illustrated.

In FIG. 8, the user or application that needs to adjust or initiate processing in the KStore system will access the state variables of interest through an interface 361B. In fact, the builder or user of the KStore system we describe here may build nearly any kind of interface structure in the applications layer he wants to. The only critical requirement in the applications layer 16 is that it communicate through an interface such as the API 372B which provides multiple routines to access the KEngine, K Structure and associated memory areas. One would expect that the arrangement of applications layer components would include a Switch Handler which will process these requests as needed, interpreting them appropriately for the system under consideration. For example, if a system is established with some number of different default settings to be set into an instance of a K Engine or K Engine and KStore combination for a given set of threads, a single command through the GUI or other interface may be used to choose the default most appropriate for the user's or the application's needs. Thus, the application will handle communication of this set of state variables to the API Utility segment 372B, which will make appropriate changes in the state variables and the like in the K Engine memory 376B or in K (and/or in K's associated state memory, not shown).

Figure 1B:
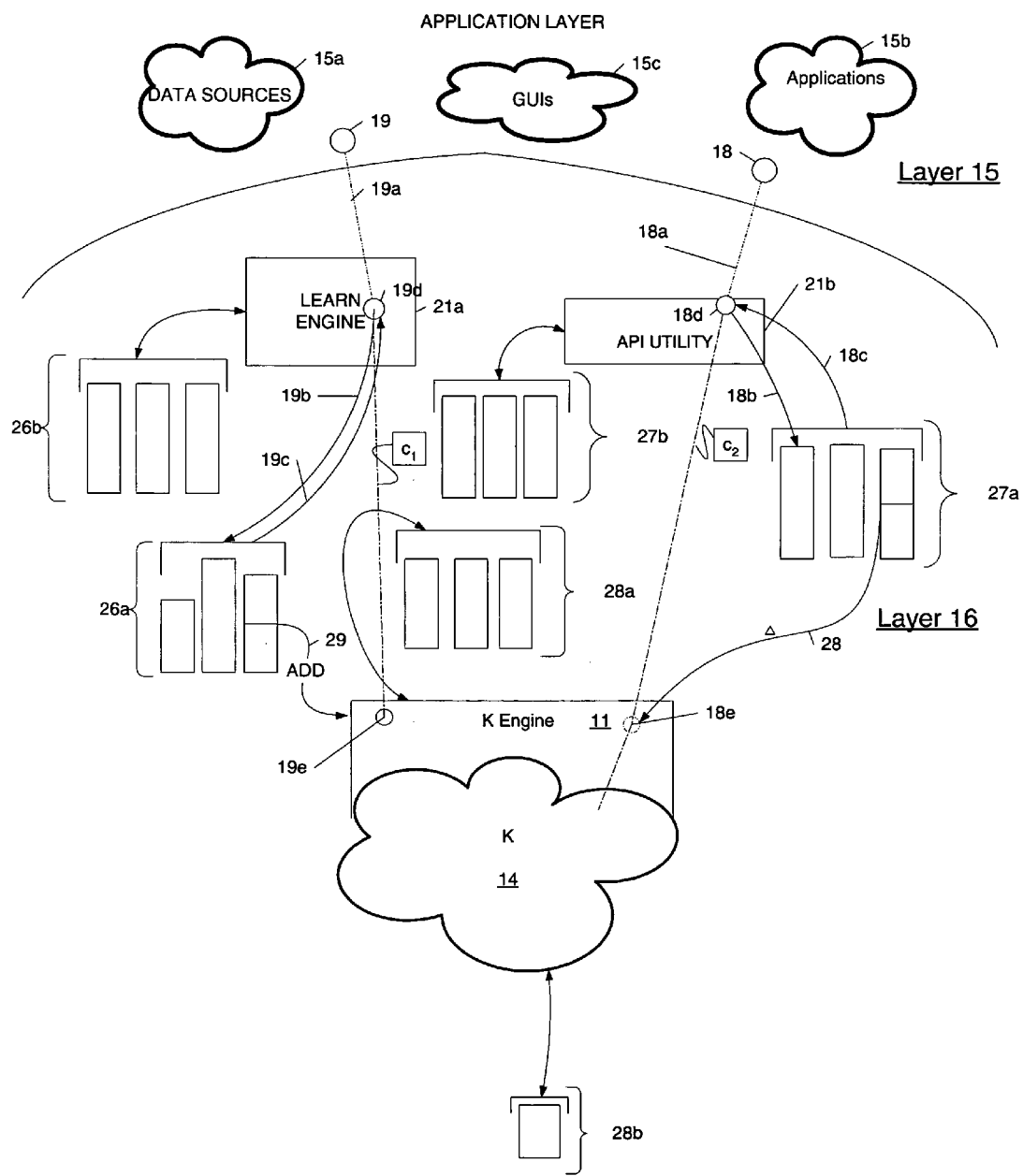
FIG. 1B is a block diagram illustrating processes used in a learn function in building a KStore interlocking trees datastore.

Additionally, it should be noted that the administrative routines of the API Utility will also (preferably) be called upon to instantiate the K Engine and set up the basic parameters used in the one or more KStores and that this K Engine instantiation will be called upon to build and/or access the K structure. The Utility segment together with the send/receive subcomponent will have the addresses and other information needed to contact a K Engine instantiator object, here illustrated as a System Component Generator 389. In this instantiation process, metadata such as what data in a particle is to be defined and operate as a delimiter, whether the Learn switch is to be on or off, and every relevant configuration variable will be established. As there are a vast number of ways to do this, after the understanding of the KStore system conveyed herein, the reader of ordinary skill in the programming arts will be able to put such ways into effect without undue experimentation and with relatively little programming effort or thought. In FIG. 1B, layer 16 is a layer that contains at least one instance of API Utilities and/or a Learn Engine 21b/21a. We can simply call an interface object since for the features shown in this diagram; it functions similarly for both types of interface objects. This object contains or is the set of programs that enable calls for information or data input 19, 18, to address K regardless of the form they are in. Calls to this object Learn Engine 21b or API Utility 21a, initiates a thread, threads 19a or thread 18a, respectively. This thread may supply a continuous or a discontinuous stream of data to the Learn Engine or contain the parameters of a query for the API Utilities. The programs in the software object 21 set up a data storage area 26, 27 in memory (preferably on the server, thus in layer 16) to accommodate the processing needs of the thread 19a, 18a, respectively. The threads are given "cookies" or keys C1, and C2, respectively, which enable them to access the memory areas. Such access of thread-controlled memory areas is accomplished using reentrant code of the software object 21a/21b which has routines 19d, and 18d, respectively. These routines will enable passing address, pointer or other particle-related data to the thread into or out of the data storage areas 26, 27 as the thread executes. Thus, in the case of the Learn Engine, pointer addresses indicating where in a sequence the location pointer is currently for this thread, a list of pointers to all sets of relevant nodes, and information of that nature are stored and accessed from the memory areas 26 or 27 as the need arises. The data in memory areas 26 and 27 are thus used to drive the activity of the K Engine 11, in that they help the K Engine construct an action to place a new event or find an existing event within K. Based on the result of the activity of the K Engine, the API Utility routines may add data (using reentrant code 19e to update the data 29 in data storage area 26, or change some data already in the data storage area 27 (using reentrant code 18e with the changes in the data 28)). In other words, we are passing the address of the data storage area around, so we can update the data directly. That's not to say that one could not have a separate piece of code associated with such data transfers/modifications whose sole job is to manage the storage area.

Generally then, the threads are created by the appearance of new data being sent to a Learn Engine or a query asking for results from an API Utility handling such requests. In the case of the Learn Engine 21a, managing this thread creation requires the allocation or establishment of memory resources 26a and keys or cookies C1 so that the thread will have access to these established memory resources. In the case of the API Utility 21b, it will also establish the memory resources 27a and keys or cookies C2 to manage the query thread and to guide its operation between the K structure 14 and the K Engine 11. The K Engine will handle the events in the realm of K 14, producing a current location pointer, which can be used by the API Utility to traverse KStore and answer the relevant query or part of query the thread is working on. One of ordinary skill in the programming arts is familiar with the concept of threads and how to have various objects create them in a computer system responsive to program-generated signals and/or data messages and the like, so no further discussion about how to accomplish this using threads is required. Likewise, it will be readily understood by those of ordinary skill in the programming arts that such a set of processes can be created in nearly any modern programming language without any difficulty, and that there are numerous ways to do so.

These memory resources 26a and 27a allocated to threads 19a and 18a, respectively, provide places that the Learn Engine and the API Utility can buffer and manage intermediate processing. Such intermediate processing may be needed to satisfy the function of the Learn Engine and the API Utility in supporting the activities of the threads. In the Learn Engine, memory area 26a would be used to hold data being particlized as a buffer while the Learn Engine functions to separate and manage each particle as needed. The memory area would also provide space to maintain pointer lists for determining which particle is being sent to the K Engine currently, and the relationship, structure-wise of this event to the data stream being input from the data source. Lines 19b and 19c indicate a path between the thread's reentrant code segment 19d and the memory area 26a which controls the particlizing process, allocating particles and any other needed parts (if any) of the incoming data stream to the memory area. Line 29 facilitates the entry of the Learn Engine's particle data as a part of the message carried to the K Engine by the thread 19a, at section 19e, In here, the K Engine 11 processes the recording of the event in K 14 and returns the current location pointer to the Learn Engine. (Thus, in the drawing, thread 19a may not continue into K itself, unlike thread 18a, which in some circumstances described below can, without going through the K Engine). Importantly for this invention it should be noted that the tables or other data structures that hold current locations for a Learn Engine would preferably be located in the memory areas 26a or 26b.

The API Utility-related thread 18a would use its memory area 27a to enable the same kinds of functions in a similar manner, supporting thread 18a's activities in making a query, using the resources of the API Utility 21b. Again, a key or cookie (C2) would preferably be provided for the thread to manage its access to the memory area 27a. Again pointer data and data related to the thread's activity, in this case an inquiry of K, are stored in area 27a while the processing of the thread is unfolding. Here, data is returned, in the form of memory location pointers or addresses along line 28 from a piece of reentrant code 18e that the API Utility routine operates with. The management of the memory area, which can be quite complex for a complex query, is handled through reentrant code 18d and communications pathways or messages 18b and 18c.

Note too that in preferred embodiments additional memory areas are allocated for the K engine (area 28a) and for the KStore (K 14) itself (area 28b). Use of such memory areas are preferable to support functions such as switches to determine the various states and conditions for the K Engine and the K structure itself as the API Utility routines determine how to respond to queries or additional data input, whether to learn it or not, and for various features that might be program controlled. For one example, if we have two K Engines, both accessing a single K, the memory area 28b would be used to lock K so that it could learn a new event. For the time K is locked, only the K Engine having access to it (or the part of it that may be locked) could alter that K (or that area of K). Memory area 28a would be needed to store information related to the abilities or configuration of the particular K Engine that uses it. As the reader becomes familiar with use of K and K Engines, additional particular uses for such memory areas may become apparent, but at base, it is most useful to have a dedicated memory region to store each K's state and the state of any universal property switches that may be in use, and a dedicated memory region for each K Engine's state and the states of any properties that will be used by any set of threads.

Generally, the threads will produce calls from the API Utility and the Learn Engine to the K Engine to effect the learning or the query. The K engine processes 'particles' and returns the current location of the K location pointer to the caller. If the 'particle' sent is recognized, the K engine will try to record the event by moving from the current location of the K pointer to a location on K that has recorded this event before. If there is no past record of an event equivalent to this, new K structure will be created to record the new event. If the 'particle' sent is not recognized, the current K pointer stays the same. In a preferred embodiment, the K Engine will ignore the event as 'noise' and the calling routine will have to decide how to process this event. However, at some point the K Engine might "decide" based on a switch setting to send an error message or to create a new sensor, or perform some other task, whether it be communication to another component or sending an Email or modifying its activities with respect to K. Switches or modified K Engines can enable endless such activities, as the imagination of one of ordinary skill in these arts can easily conceive.

Figure 10:
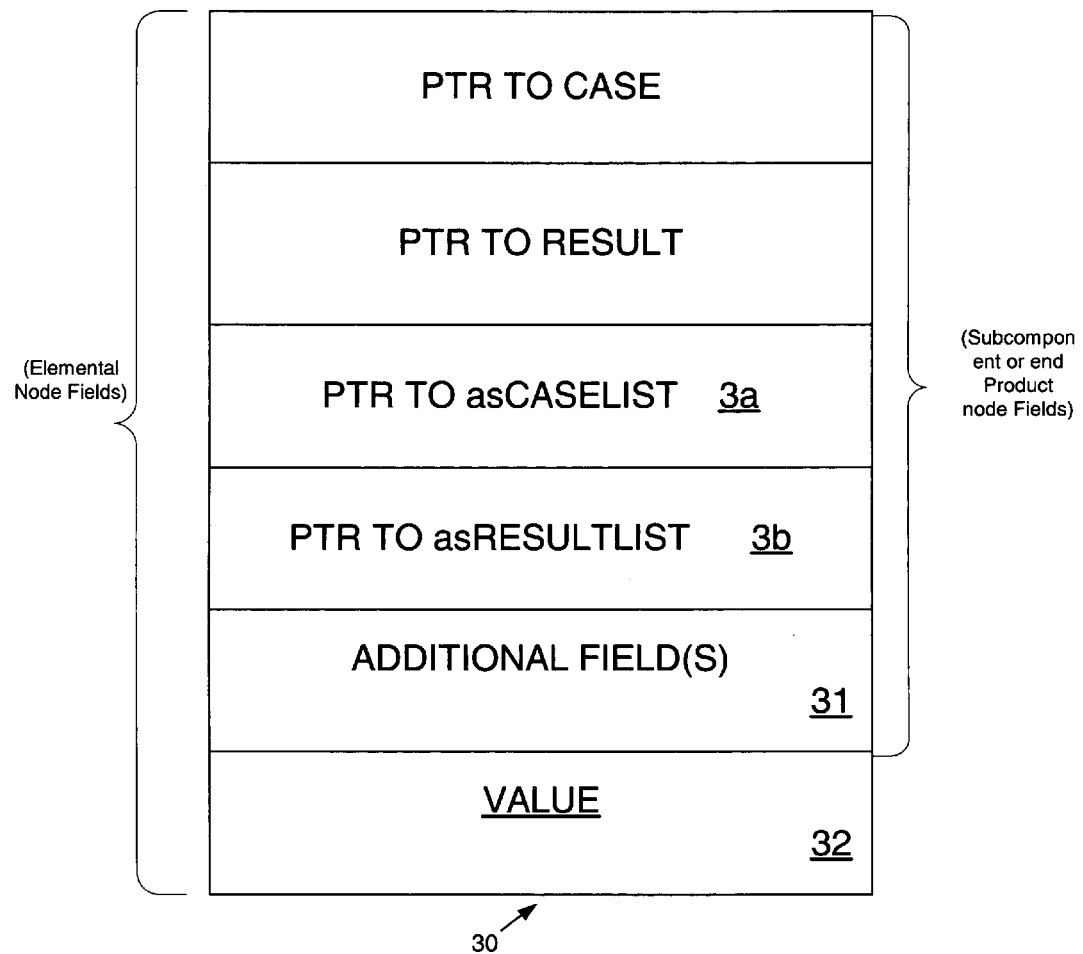
FIG. 10 is a block diagram of a generalized node data structure.

It should be noted that switches can powerfully affect the K Engine performance and allow for control over its configuration. Specific switches we have used include at least one for Learn(Y or N), Column numbers or other identifiers (Y or N), Meta Data field names used instead of column numbers(Y or N), EOT levels (Number and names), EOTCOL (column name), EOTVAR (variable), EOTFLD (field entry), EOTRCD (record), and importantly for this invention, whether and how to use Marks and References. One of ordinary skill in these arts will recognize that this list is far from exhaustive and that different switches will be created for different uses for the KStore. For example, a host of switches may be set up for a KStore that stores images, relating to pixel information. The nodes in the structure will typically have a form as illustrated in FIG. 10 which illustrates the data fields of a typical node 30.

This node 30 may include a string field, as the additional field 31, that contains a sequence that shows all of the elemental root nodes represented by this node. The addition of a string field including this sequence of elementals is helpful in debugging. There can be many uses for such additional fields and the nodes such as node 30 need not be limited to one additional field.

Further, recognize that the pointer the pointer to asResult list field 3b will be null for all subcomponent nodes and that the pointer to asCase List field 3a will be null for the elemental nodes and endproduct nodes.

The exemplary node 30 may also include a count field as an additional field 31. The count field is initialized and incremented with an intensity variable, whose value varies with conditions at times when the count field is being referenced. (An intensity variable is defined as a mathematical entity holding at least one unchangeable value). By making this term so broad the intensity variable populated count field can be used for applications of the inventive interlocking trees structure to processes dealing with forgetting erroneous recorded data, recording which entity is doing the inquiry, recording the type of inquiry being used, and other processes of interest which may be derived when using the data. A simple example form of an intensity variable would be a single ordinal field value, such as '1' to be used to increment or decrement count fields to record the number of times that a node has been accessed or traversed. If the node were an elemental root node it would also contain a value field 32. Most of this node construction is already discussed in prior applications U.S. Ser. No. 10/666,382 and 10/385,421, incorporated by reference above.

A second data set using the previously taught method is provided in FIG. 6. It identifies the salesperson, day, item number, disposition and price. The reader should note that the columns for price and item number can contain the same data, though in different contexts, as illustrated by this Figure.

The methods and system described above may be embodied in the form of program code (i.e., instructions) stored on a computer-readable medium, such as a floppy diskette, CD-ROM, DVD-ROM, DVD-RAM, hard disk drive, memory stick, main memory, or any other machine-readable storage medium, currently known or presently unknown wherein, when the program code, which itself is a set of organized data signals in electronic, optical or other form, is loaded into and executed by a machine, such as a computer, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. The program code may be implemented in a high level programming language, such as, for example, C, C++, or Java. Alternatively, the program code may be implemented in assembly or machine language. In any case, the language may be a compiled or an interpreted language.

It is noted that the foregoing examples have been provided merely for the purpose of explanation and are in no way to be construed as limiting of the present invention. For example, the interlocking trees datastore can be implemented using object-oriented technologies, procedural technologies, a hybrid thereof or any other suitable methodology. Furthermore, although the examples presented show the dataset elements stored in a memory, one of skill in the art will understand that this functionality can be implemented in many different ways. For example, the invention contemplates the use of many different sets of dataset elements of many different universes stored on multiple remotely located machines.

While innumerable uses for this invention may be found, and significant variability in the form and manner of operation of this invention are described and will occur to those of skill in these arts, the invention is not limited in scope further than as set forth in the following claims.

What is claimed is:

1. An improved method of operating a learn unction which provides particlized messages to a K Engine for learning by an interlocking trees datastore, wherein said learn function receives data input streams in sequences, and provides serial particle streams of said particlized messages to said K Engine and recording said data input streams into said interlocking trees datastore, said method comprising;
   preparing a serial pre-particlization sequence incorporating control characters for each desired Mark and Reference in said serial pre-particlization sequence,
   preparing a learn function accessible memory structure identifying at least one K location to each Mark,
   finding Marks and References in said prepared serial pre-particlization sequence,
   processing said found Marks and References,
   preparing particles and recording said prepared particles in the interlocking trees datastore from said pre-particlization sequence, incorporating a K location for each Reference, the interlocking trees datastore comprising nodes and non-root nodes organized into a plurality of connected trees, the plurality of connected trees comprising an asCase tree and at least one of a plurality of asResult trees, the asCase tree comprising a first root and at least one of a plurality of non-root nodes, the at least one non-root node comprising a first Case node, and the at least one asResult tree comprising a second root node representing a particle of the prepared particles and at least one of a plurality of non-root nodes common with the nodes of the asCase tree, the at least one non-root node common with the nodes of the asCase tree comprising a first Result node.

2. The method of claim 1 wherein each said sequence of an input data stream comprises a record from a field record database.

3. The method of claim 1 wherein said preparing a learn function accessible memory structure comprises configuring an array of said K locations identified to said each Mark and using said array to produce a particular K location for each said Reference.

4. The method of claim 1 further comprising sending said particles to said K Engine and receiving back by said learn function from said K Engine a K location for each said particle so sent.

5. The method of claim 4 wherein said processing of said found Marks and References further comprises;
   recording in said learn function accessible memory structure the K location returned from a K Engine, wherein said K Engine has recorded a particle originating from just prior to a Mark in said pre-particlization stream, and
   if a Reference associated with said Mark appears in a pre-particlization sequence, employing said returned K location to establish an address in K for the particle originating from data which followed the Reference in the pre-particlization sequence.

6. The method of claim 1 wherein said K location comprises a pointer having an address for a node at each level in said interlocking trees datastore.

7. The method of claim 1 wherein said K location comprises a pointer to at least one node from one level in said interlocking trees datastore.

8. The method of claim 1 wherein an application level component creates said input data streams for said learn function from at least one data source and in so doing associates Marks and References to data in said input data streams from said at least one data source.

9. The method of claim 8 wherein said application level component receives data from said data source in data source sending format and configures it to be in a format that has only the data desired.

10. The method of claim 1 wherein a component internal to the learn function associates Marks and References to data in said input data streams from said at least one data source.

11. The method of claim 10 wherein said component internal to said learn function receives said input data streams from said at least one data source in data source sending format and configures it to be in a format having only data desired to be learned by a designer of a particular interlocking trees datastore, and in a predetermined organizational format before associating Marks and References to data in said input data streams.

12. The method of claim 1 further comprising finding metadata in said input data stream in said learn function, and based on said metadata, inserting Marks and References into said input data stream at locations indicated by said metadata.

13. The method of claim 12 further comprising preconfiguring said learn function to adapt to said metadata.

14. The method of claim 1 further comprising preconfiguring said Learn Engine to interpret an input data stream so as to predetermine insertion points for Marks and References based on preset understanding of a formatting of said input data stream.

15. The method of claim 1 wherein when an input data stream includes tabular data, at least each new row or column of said tabular data is associated to a single Mark by a new Reference.

16. A computer facilitated learning function system component for providing particlized messages to a K Engine, which K Engine is providing learning data input from said learning function system component to an interlocking trees datastore, said learning function system component comprising;
   first process control component for inserting Marks and References into an input data stream in accord with predetermined controls for location of said Marks and References within said input data stream, said first process control component producing an ordered pre-particlized sequence of data from said input data stream having said Marks and References located therein in accord with said predetermined controls,
   second process control component for removing Marks and References from said pre-particlized sequence of data while building particle messages from said pre-particlized sequence, and for each Reference removed, inserting a K location into a message wherein said K location is related to said removed Reference via a Mark related to said removed Reference, and
   a storage component located in a memory for storing said Marks to enable association of each such Mark to a Reference and recording said ordered pre-particlized sequence of data in the interlocking trees datastore, the interlocking trees datastore comprising nodes and non-root nodes organized into a plurality of connected trees, the plurality of connected trees comprising an asCase tree and at least one of a plurality of asResult trees, the asCase tree comprising a first root and at least one of a plurality of non-root nodes, the at least one non-root node comprising a first Case node, and the at least one asResult tree comprising a second root nod representing a particle of the pre-particlized sequence of data and at least one of a plurality of non-root nodes common with the nodes of the asCase tree, the at least one non-root node common with the nodes of the asCase tree comprising a first Result node.

17. The learning function system component of claim 16 wherein said first process control component is for inserting a particular kind of control character for each Mark, each such control character for a Mark having an associated index value through which each of said References to a related one of said Marks, and wherein said first process control component also is for inserting a second particular kind of control character for each Reference, each Reference having an associated index value through which it may be related to a particular Mark.

18. The learning function system component of claim 16 further comprising an interpretive component for determining from an input data stream where to cause said first process control component to insert said Marks and References.

19. The learning function system component of claim 16 further comprising a configurator component for formatting input data streams into predetermined order before providing said input data streams into said first process control component.

20. The learning function system component of claim 16 further comprising an access through a GUI for determining functionality of components of said learning function system component, said components of said learning function system component including but not limited to a configurator component, a data stripper component, an interpretive component, said first process control component, and said second process component.

21. A computer readable storage medium including digitally encoded data readable by a processing system having a KStore interlocking trees datastore, stored therein, a learning function system component as set forth in claim 16, and a K Engine, for communicating between said KStore interlocking trees datastore and said learning function system component.

22. The computer readable storage medium of claim 21 having instructions for configuring a computer system when activated on said computer system a computer system as set forth in claim 21.

23. A computer readable memory having instructions for configuring a computer system when activated on said computer system a process as set forth in claim 1.

\* \* \* \* \*